(12) United States Patent
Alpert et al.

(10) Patent No.: US 12,360,893 B2
(45) Date of Patent: Jul. 15, 2025

(54) ADDRESS SPACE MAPPING

(71) Applicant: TEXAS INSTRUMENTS INCORPORATED, Dallas, TX (US)

(72) Inventors: Yaron Alpert, Hod Hasharon (IL); Barak Cherches, Ramat-Hakovesh (IL); Guy Shubeli, Ramat-Hasharon (IL); Yoav Ben-Yehezkel, Netanya (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/463,046

(22) Filed: Sep. 7, 2023

(65) Prior Publication Data

US 2025/0086107 A1    Mar. 13, 2025

(51) Int. Cl.
*G06F 12/02* (2006.01)
*G06F 12/14* (2006.01)

(52) U.S. Cl.
CPC ...... *G06F 12/0292* (2013.01); *G06F 12/1458* (2013.01); *G06F 2212/1052* (2013.01)

(58) Field of Classification Search
CPC ....... G06F 12/0292; G06F 12/10–1036; G06F 12/1458; G06F 2212/1052
See application file for complete search history.

(56) References Cited

U.S. PATENT DOCUMENTS

| | | | |
|---|---|---|---|
| 5,555,387 A * | 9/1996 | Branstad | G06F 12/10 711/208 |
| 6,374,342 B1 * | 4/2002 | Sasahara | G06F 12/1027 711/212 |
| 7,089,377 B1 * | 8/2006 | Chen | G06F 9/45537 711/138 |
| 10,380,027 B2 | 8/2019 | Coffin et al. | |
| 2002/0091718 A1 | 7/2002 | Bohannon | |
| 2006/0149919 A1 * | 7/2006 | Arizpe | G06F 12/1009 710/22 |
| 2009/0150605 A1 | 6/2009 | Flynn et al. | |
| 2013/0332660 A1 | 12/2013 | Talagala | |
| 2017/0147499 A1 | 5/2017 | Mohan et al. | |
| 2017/0192901 A1 * | 7/2017 | Coffin | H04L 49/70 |
| 2019/0164610 A1 | 5/2019 | Zamir | |
| 2020/0257517 A1 | 8/2020 | Seater | |

(Continued)

FOREIGN PATENT DOCUMENTS

TW    1676116 B    11/2019

OTHER PUBLICATIONS

Live Firmware Update Without Device Reset On C2000™ MCUs, Texas Instruments Application Note, Aug. 2021.

(Continued)

*Primary Examiner* — Khoa D Doan
(74) *Attorney, Agent, or Firm* — Brian D. Graham; Frank D. Cimino

(57) ABSTRACT

In an embodiment, a method includes receiving a logical address from a primary device and determining an address header based on the logical address. The method also includes determining an offset value based on the address header and applying the offset value to a first portion of the logical address to create an offset address portion. The method further includes generating a physical address that includes the address header and the offset address portion and accessing a physical resource using the physical address.

36 Claims, 11 Drawing Sheets

(56) References Cited

U.S. PATENT DOCUMENTS

2020/0301698 A1 9/2020 Rosner
2023/0139729 A1 5/2023 Barczak

OTHER PUBLICATIONS

Live Firmware Update Without Device Reset On C2000™ MCUs, Texas Instruments Application Note, Sep. 2022.
International Search Report for PCT/US2024/045825 dated Nov. 13, 2024.

* cited by examiner

ADDRESS SPACE MAPPING

CROSS-REFERENCE TO RELATED APPLICATIONS

This application is related to U.S. patent application Ser. No. 18/340,993, filed Jun. 26, 2023, entitled "FIRMWARE UPDATE WITH LOGICAL ADDRESS REMAPPING," and associated with, which application is hereby incorporated herein by reference.

TECHNICAL FIELD

This disclosure relates generally to an electronic system and method, and, in particular embodiments, to address space mapping.

BACKGROUND

In embedded systems, a system-on-chip (SoC) may include various components that function to provide functionality of an application or software program. For example, the SoC may include one or more processors (e.g., central processing units (CPUs)) that can execute instructions of the application to enable such functionality. The instructions may indicate a set of addresses, and each address may point to a particular place for the CPU to read from or write to in executing the instructions.

When a CPU executes a set of instructions, the CPU may use different components to carry out the execution, such as read-only memory (ROM) random access memory (RAM), cache memory, flash memory, or a hardware element, among other components. In several examples, the SoC may include a memory translation entity, such as a memory management unit (MMU), to enable CPU access to different components at different times. The MMU may contain a mapping of addresses recognizable by the CPU (i.e., addresses requested for access by the CPU) and addresses of physical locations in the components. Thus, allocation of resources of the SoC can be managed by the MMU.

In some examples, the MMU may further implement security restrictions to block unauthorized access to the components of the SoC. To do so, the MMU may include firewall protection specific to each physical component. In other examples, the MMU may instead provision access regardless of whether the access is authorized or not, and the physical components may include firewall protection to prevent unauthorized access.

SUMMARY

Disclosed herein are improvements to address space mapping, and more specifically, to mapping logical addresses to physical addresses using dynamic offset values. Logical addresses may refer to virtual addresses generated by a processor (e.g., a CPU) when executing program instructions and attempting to access a physical resource in the execution of the program instructions. Physical addresses may refer to addresses corresponding to memory locations in a physical resource (e.g., read-only memory, random access memory, flash memory). In an example embodiment, a method of mapping a logical address to a physical address is provided and includes receiving a logical address from a primary device and determining an address header based on the logical address. The method also includes determining an offset value based on the address header and applying the offset value to a first portion of the logical address to create an offset address portion. The method further includes generating a physical address that includes the address header and the offset address portion and accessing a physical resource using the physical address.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter.

BRIEF DESCRIPTION OF THE DRAWINGS

The drawings are not necessarily drawn to scale. In the drawings, like reference numerals designate corresponding parts throughout the several views. In some examples, components or operations may be separated into different blocks or may be combined into a single block.

DETAILED DESCRIPTION

Figure 1:
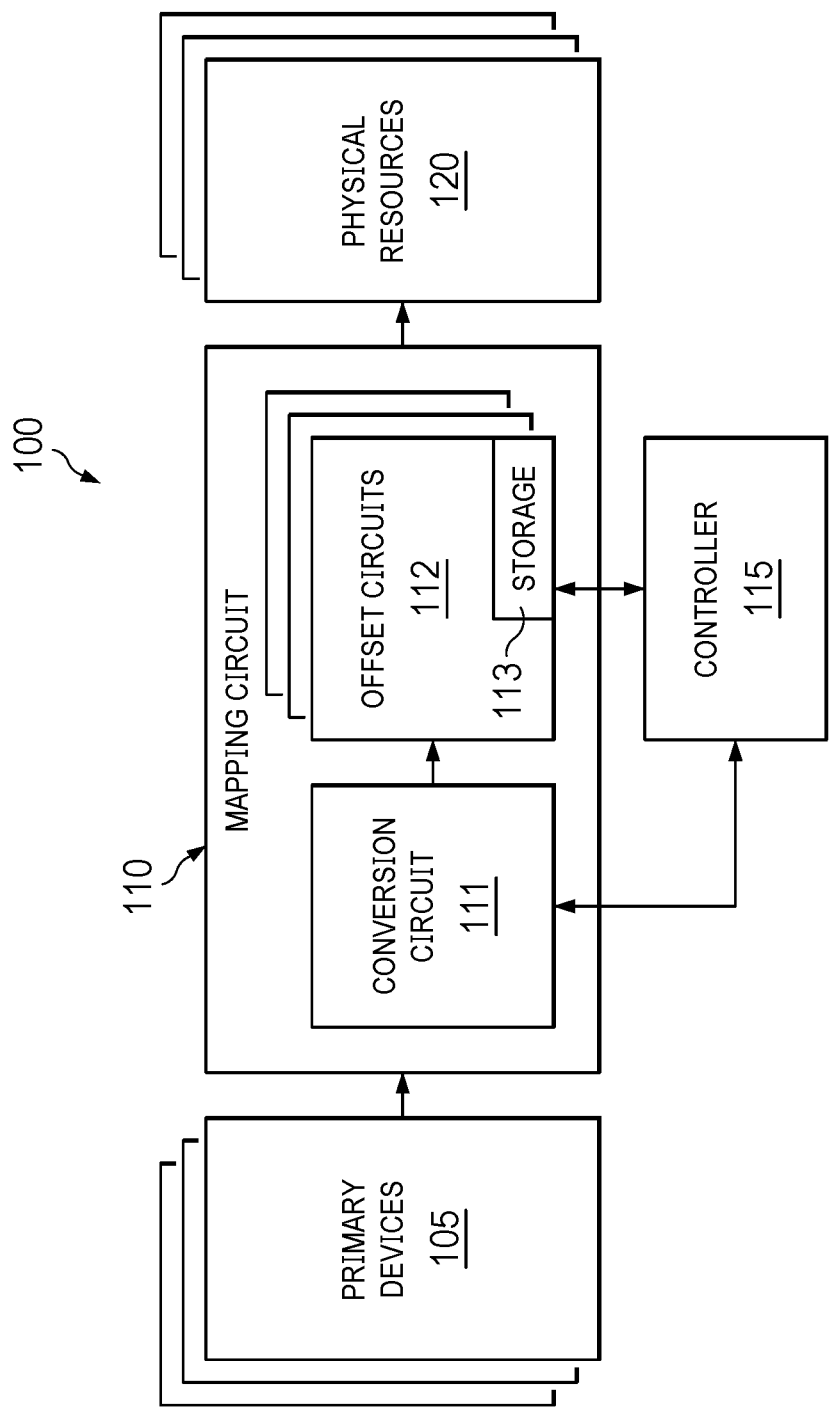
FIG. 1 illustrates an example operating environment configurable to map logical addresses to physical addresses in an implementation.

Discussed herein are enhanced components, techniques, systems, and methods related to address space mapping, and in some embodiments, to mapping logical addresses to physical addresses, e.g., using dynamic offset values. In some embodiments, an embedded system includes one or more processors and various other components, such as memory devices, peripheral devices, hardware accelerators, and the like, in which the one or more processors can be configured to execute program instructions to enable functionality provided by the program instructions. In the execution of the program instructions, a processor may attempt to access one or more physical resources. The processor may attempt to access a physical resource with a set of logical addresses. A logical address may refer to a virtual address generated and recognized by the processor (e.g., a CPU). The SoC may also include a mapping system, which may be configured to receive the logical address associated with an access attempt by the processor and identify a physical address based on the logical address. A physical address may refer to an address corresponding to a memory location in a physical resource (e.g., read-only memory, random access memory, flash memory). Accordingly, the mapping system can enable access to the physical resources during execution of the program instructions.

In some examples, the mapping system can include one or more hardware components, such as a mapping circuit and one or more offset circuits, that can be coupled to receive a logical address from a processor, a direct memory access (DMA) controller, or the like, and map the logical address to a physical address, e.g., or a subset of bits thereof, associated with a physical resource. In some examples, the mapping system can include components implemented in hardware, software, and/or firmware. In some embodiments, the mapping system can be dynamically updated, such that the mapping of logical addresses to physical addresses can be changed during run-time operations of the SoC and during the execution of the program instructions by the processor. In some embodiments, the mapping system may advantageously eliminate the use of firewall protections at the physical resources, as security protections can be applied on the logical addresses provided by the processor and identified by the mapping system when mapping the logical address to the physical address.

Advantageously, a mapping system used for address space mapping may not only reduce hardware design requirements and costs by eliminating the need for firewall protection at each physical resource of a SoC, but may also reduce downtime of the system-on-chip by using updateable offset values when determining the physical address such that memory of physical resources may be re-allocated or de-allocated on-the-fly during runtime operation of the SoC.

One example embodiment includes a method. The method includes receiving a logical address from a primary device and determining an address header based on the logical address. The method also includes determining an offset value based on the address header and applying the offset value to a first portion of the logical address to create an offset address portion. The method further includes generating a physical address that includes the address header and the offset address portion and accessing a physical resource using the physical address.

In another example embodiment, an electronic circuit including a conversion circuit and an offset circuit is provided. The conversion circuit is configured to receive, from a primary device, a logical address associated with a physical resource, determine an address header based on the logical address, and provide the address header to the offset circuit. The offset circuit is configured to determine an offset value based on the address header, apply the offset value to a first portion of the logical address to create an offset address portion, generate a physical address that includes the address header and the offset address portion, and output the physical address.

In yet another embodiment, an electronic circuit is provided that includes a conversion circuit and a plurality of offset circuits. Each of the offset circuits may be coupled to the conversion circuit. The conversion circuit includes an interface device configured to receive a logical address from a primary device and a first selector device configured to select a first offset circuit from the plurality of offset circuits based on the logical address and provide a first portion of the logical address to the first offset circuit. Each offset circuit includes a storage device configured to store an offset value associated with a physical resource and an adder device configured to add the offset value with the first portion of the logical address to generate an offset address portion. The electronic circuit is configured to provide a physical address that includes the offset address portion.

FIG. 1 illustrates an example operating environment configurable to map logical addresses to physical addresses in an implementation. FIG. 1 includes operating environment 100, which includes primary devices 105, mapping circuit 110, controller 115, and physical resources 120. Mapping circuit 110 further includes conversion circuit 111 and offset circuits 112. In various examples, mapping circuit 110 may perform mapping processes, such as process 200 of FIG. 2. In some embodiments, a primary device 105 and mapping circuit 110 may operate in a master/slave configuration, where the primary device 105 is the master device and the mapping circuit 110 is the slave device. In some embodiments, primary devices 105, mapping circuit 110, and controller 115, are implemented, e.g., in a monolithic substrate, inside an integrated circuit. In some embodiments, one or more of primary devices 105 is implemented outside the integrated circuit. In some embodiments, one or more physical resources 120 are implemented inside the integrated circuits. In some embodiments implement primary devices 105, mapping circuit 110 controller 115, and physical resources 120 using discrete components. Other implementations are also possible.

In various embodiments, primary devices 105 are representative of one or more computing devices capable of executing program instructions from physical resources 120 in accordance with application code. Physical resources 120 may include one or more memory devices (e.g., ROM, RAM, flash memory), hardware components (e.g., hardware accelerators, peripherals, external memory), and the like, internal or external to a system encompassing primary devices 105 and/or mapping circuit 110. In some embodiments, one or more of primary devices 105 may be implemented as a generic or custom processor or controller, e.g., capable of executing instructions stored in an associated memory. Examples of primary devices 105 may include one or more processors or processing cores (e.g., a CPU), a direct memory access (DMA) controller, or the like. Specifically, in some embodiments, primary devices 105 may include one or more ARM V8 processors. When primary devices 105 attempt to access a location in a memory device or hardware component in executing the program instructions, primary devices 105 may generate logical addresses (i.e., a virtual address) that corresponds to the particular device primary devices 105 are attempting to access and provide the logical address to mapping circuit 110.

In some embodiments, the logical address may include information about primary devices 105 (e.g., such as a host identifier), the type of access being attempted, the device that one or more of primary devices 105 is attempting to access (e.g., one or more of physical resources 120), a block index including bits indicative of data or code related to the program instructions, and a block size indicative of the size of the block index. In examples including multiple primary devices, mapping circuit 110 may receive logical addresses from several primary devices. Thus, the logical address may indicate a primary device providing the logical address. In some embodiments, the type of access being attempted may refer to whether the access is secure or non-secure.

In various embodiments, mapping circuit 110 may be representative of a memory management circuit that includes one or more hardware components configured to receive logical addresses from one or more of primary devices 105, generate physical addresses based on the logical addresses, and provide access to corresponding physical resources using the physical addresses. In some embodiments, mapping circuit 110 may include components capable of executing software and/or firmware. In some embodiments, mapping circuit 110 is used instead of a conventional memory management unit (MMU).

In operating environment 100, mapping circuit 110 includes conversion circuit 111 and one or more offset circuits 112. Conversion circuit 111 may be representative of a hardware accelerator, including various hardware components, logic devices, and the like, configured to receive the logical address from one or more of primary devices 105.

Conversion circuit 111 may identify information in the logical address, such as the memory type or name of the physical resources 120 that primary devices 105 are attempting to access via the logical address and the security type. Conversion circuit 111 may create an address header based on the memory type and the security type. The address header may include a number of bits indicative of data or information that may be used to access a selected one of physical resources 120. Based on the address header, conversion circuit 111 may identify one of offset circuits 112 and provide the address header and the block index and block size from the logical address to the identified offset circuit.

Offset circuits 112 may be representative of hardware accelerators, including various hardware components, logic devices, storage devices (e.g., storage 113), and the like. In various examples, one offset circuit 112 may correspond to one physical resource. Accordingly, conversion circuit 111 may provide the address header to a particular offset circuit based on the address header and the associated physical resource. Each offset circuit may include storage 113, representative of a memory or other storage hardware device (e.g., a flip-flop), which may include one or more offset values applicable to the logical address generated by primary devices 105. In use, the identified offset circuit may determine an offset value based on the address header provided by conversion circuit 111 and obtain the offset value from storage 113. The offset circuit may apply the offset value to a portion of the logical address, such as the block index, to create an offset portion. The offset circuit may use the address header, offset portion, and the block size to generate a physical address corresponding to a memory location in the associated physical resource. Using the physical address, mapping circuit 110 may allow primary devices 105 to access the physical resource, or a range of memory thereof.

Mapping circuit 110 may further be coupled with controller 115. Controller 115 may be representative of a processor, microcontroller unit, or any other type of computing device capable of writing to or updating a mapping of logical addresses to physical addresses (e.g., through offset values) stored in storage 113 of offset circuits 112, e.g., via a configuration interface or communication interface. In some embodiments, controller 115 is capable of writing to or updating a mapping of logical addresses to physical addresses by updating stored values, and/or affecting the operation of selection circuits of conversion circuit 111 and/or one or more of offset circuits 112, e.g., via a configuration interface or communication interface. In some embodiments, controller 115 may be implemented as an interface to allow an external device to directly affect operation of conversion circuit 111 and/or one or more of offset circuits 112, e.g., by allowing the external device to change values of one or more LUTs. In various embodiments, controller 115 may alter offset values for different ones of physical resources 120. By way of a first example, with respect to a first logical address, an offset circuit may use a first offset value to generate a first physical address that corresponds to one of physical resources 120. At a later time (e.g., after the first logical address has been remapped to a different memory location and/or resource), controller 115 may update the first offset value creating a second offset value. The offset circuit may then use the second offset value to generate a second physical address. The second physical address may correspond to a different location in the same physical resource as the first physical address, or the second physical address may correspond to a different physical resource entirely. Any combination or variation may be contemplated. Updating the offset values may include changing the state of a bit stored in offset circuits 112 (i.e., changing the value stored in a flip-flop of an offset circuit), changing the value of an offset value in a look-up table stored in offset circuits 112, or by way of another method. Advantageously, by changing the offset values dynamically, mapping circuit 110 can achieve re-allocation or de-allocation of physical resources 120 during run-time operations while primary devices 105 executes program instructions, or during any other time. In some embodiments, controller 115 may update parameters or components of conversion circuit 111 to alter how conversion circuit 111 generates the address headers, and/or selects to which offset circuit 112 to provide the address headers. This may entail changing an input to a selection circuit, and/or modifying an entry of a LUT associated with conversion circuit 111, for example.

Figure 2:
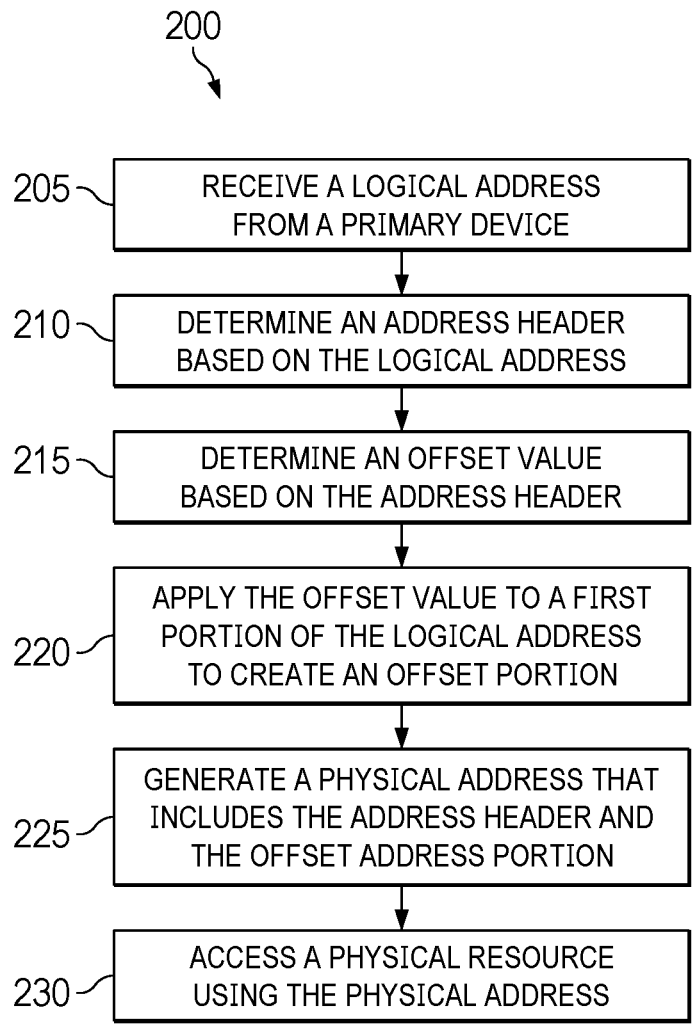
FIG. 2 illustrates a series of steps for mapping a logical address to a physical address using offset values in an implementation.

FIG. 2 illustrates a series of steps for mapping a logical address to a physical address using offset values in an implementation. FIG. 2 includes process 200, which references elements of FIG. 1. In various examples, process 200 may be implemented by one or more components of an address mapping system, such as mapping circuit 110 of FIG. 1. Process 200 may be implemented by software, hardware, firmware, or any combination or variation thereof.

In operation 205, conversion circuit 111 of mapping circuit 110 receives a logical address from one or more primary devices 105. Primary devices 105 may be representative of one or more computing devices capable of executing program instructions from physical resources 120 (e.g., non-volatile memory, volatile memory, hardware accelerator, peripheral) in accordance with application code. Examples of primary devices 105 may include one or more processors or processing cores (e.g., a CPU), a direct memory access (DMA) controller, or the like. When a primary device 105 attempts to access a location in a memory device or hardware component in executing the program instructions, one primary device 105 may generate a logical address that corresponds to the particular physical resource the primary device 105 is attempting to access and provide the logical address to mapping circuit 110.

In various embodiments, mapping circuit 110 may be representative of a memory management circuit that includes one or more hardware components configured to receive logical addresses from primary devices 105, generate physical addresses based on the logical addresses, and provide access to corresponding physical resources using the physical addresses. In some embodiments, mapping circuit 110 may include components capable of executing software and/or firmware. Mapping circuit 110 may include conversion circuit 111 and offset circuits 112. In some embodiments, conversion circuit 111 is representative of a hardware accelerator, including various hardware components, logic devices, and the like, configured to receive the logical address from primary devices 105.

In operation 210, conversion circuit 111 can determine an address header based on the logical address. To determine the address header, conversion circuit 111 may identify information in the logical address, such as the physical resource that primary devices 105 are attempting to access via the logical address and the security type, the type of access (e.g., read, write) being attempted, and the like, as well as information that may or may not be present in the logical address, such as the identification (e.g., host ID) of the device or thread requesting the translation. The address header may include a number of bits indicative of data or information that may be used to access one of physical resources 120. In an example, determining the address header may be based on a most-significant one of the bits of the logical address. Based on the address header, conversion circuit 111 may identify one of offset circuits 112 and provide the address header and the block index and block size from the logical address to the identified offset circuit.

In some embodiments, offset circuits 112 may be representative of hardware accelerators, including various hardware components, logic devices, storage devices (e.g., storage 113), and the like. In various examples, one offset circuit may correspond to one physical resource. Accordingly, conversion circuit 111 may provide the address header to a particular offset circuit 112 based on the address header and the associated physical resource. Each offset circuit 112 may include storage 113, representative of a memory or other storage hardware device (e.g., a flip-flop), which may include one or more offset values applicable to the logical address generated by primary devices 105. For example, storage 113 may include a look-up table including several offset values corresponding to a respective physical resource.

In operation 215, the identified offset circuit 112 may determine an offset value based on the address header provided by conversion circuit 111 and obtain the offset value from storage 113. Next, in operation 220, the offset circuit may apply the obtained offset value to a portion of the logical address, such as the block index, to create an offset portion. In various examples, this may entail adding a number of bits indicated by the offset value to the block index. Then, in operation 225, the offset circuit 112 may use the address header, offset portion, and the block size to generate a physical address corresponding to a memory location in the associated physical resource.

In operation 230, mapping circuit 110 may allow primary devices 105 to access the physical resource, or a range of memory thereof, using the physical address. Accordingly, mapping circuit 110 may function like a memory management unit whereby it maps logical addresses to physical addresses using dynamically determinable offset values. Furthermore, accessing the physical resource may occur without firewall intervention at the physical resource as primary devices 105 may instead apply internal, source security protocols, such as one or more source protection methodologies of a processor (e.g., ARM V8) when generating the logical address. For example, if mapping circuit 110 does not identify a (e.g., acceptable) mapping between the logical address and a physical address (e.g., by failing to identify a mapping in a LUT and/or by returning an error physical address (which may be a predetermined value or an out-of-range value, e.g., based on data of the primary device 105)) primary device 105 may not allow access to the (e.g., any of the) physical resource 120. For example, in some embodiments, if conversion circuit 111 is unable, from the logical address, to identify a physical header (e.g., the particular memory type or security type is not mapped to a particular value, e.g., in a LUT) or is unable to select an offset circuit, mapping circuit 110 may return a predetermined physical address and/or otherwise notify device 105 that there is an error in the physical address. In some embodiments, if the offset circuit 112 selected by the conversion circuit 111 to apply an offset generates an offset value that is outside a predetermined range, mapping circuit 110 may return a predetermined physical address and/or otherwise notify device 105 that there is an error in the physical address.

In some embodiments, several of the operations of process 200, such as operations 210, 215, 220, and 225, may occur within one clock cycle. For instance, determining the address header and identifying an offset module based on the address header may occur within a first edge (e.g., rising edge) of a clock cycle, and determining the offset value and applying the offset value to the block index of the logical address may occur within a second edge (e.g., falling edge) of the clock cycle.

Following access to the physical resource as in operation 230, various embodiments may include further operations in addition to those in process 200. The following examples describe non-limiting example operations that may be used in accordance with some embodiments of the present disclosure. Other examples may be contemplated but may not be included for the sake of brevity.

In a first example, process 200 may further include updating the offset value determined in operation 215 to a second offset value that has a different value from the original offset value. After updating the offset value to the second offset value, primary device 105 may provide the logical address to conversion circuit 111 again. Conversion circuit 111 may determine the same address header determined in operation 210 and identify the same offset circuit as well. However, the identified offset circuit may now determine the second offset value based on the address header due to the update to the original offset value. The offset circuit may apply the second offset value to the block index of the logical address to create a second offset address portion and generate a second physical address associated with the physical resource. Mapping circuit 110 may then provide access to the physical resource using the second physical resource.

In a second example, following the operations in process 200, primary device 105 may provide a second logical address to mapping circuit 110. The second logical address may be equal to the first logical address. Conversion circuit 111 may determine a second address header based on the second logical address. In some examples, the second address header may be different from the first address header (e.g., such as in the event where the conversion table is updated to change the location/resource being accessed by the logical address). Conversion circuit 111 may identify the same offset circuit used in process 200 or a different offset circuit. Regardless, the offset circuit can generate a second physical address different from the first physical address and that includes the second address header and a second offset address portion created by applying a second offset value to the block index of the second logical address. Using the second physical address, the offset circuit may allow access to a second physical resource, which may be different from the initially accessed physical resource.

In some embodiments, mapping circuit 110 is thread-aware (e.g., based on a host ID), such as the resulting physical address depends on which application thread requested the conversion, even when the request involves the same logical address, or the same memory type and security type thereof. For example, in a third example, receiving the logical address from primary device 105 as in operation 205 includes receiving a first request from a first thread. Primary device 105 may further provide a second request from a second thread that also includes the logical address. Conversion circuit 111 may determine a second address header based on the logical address from the second request, identify a second offset circuit based on the second address header, and provide the logical address and the second address header to the second offset circuit. The second offset circuit may apply a second offset value to the block index of the logical address to generate a second physical address associated with the physical resource different from the first generated physical address. The second offset circuit may then provide access to the physical resource using the second physical address. In some embodiments, the first and second threads are mutually exclusive in time, e.g., by design. For example, in some embodiments, the first thread may be a boot thread used during a boot sequence by primary device 105, and the second thread may be a non-boot thread used during a post-boot sequence by primary device 105.

Figure 3:
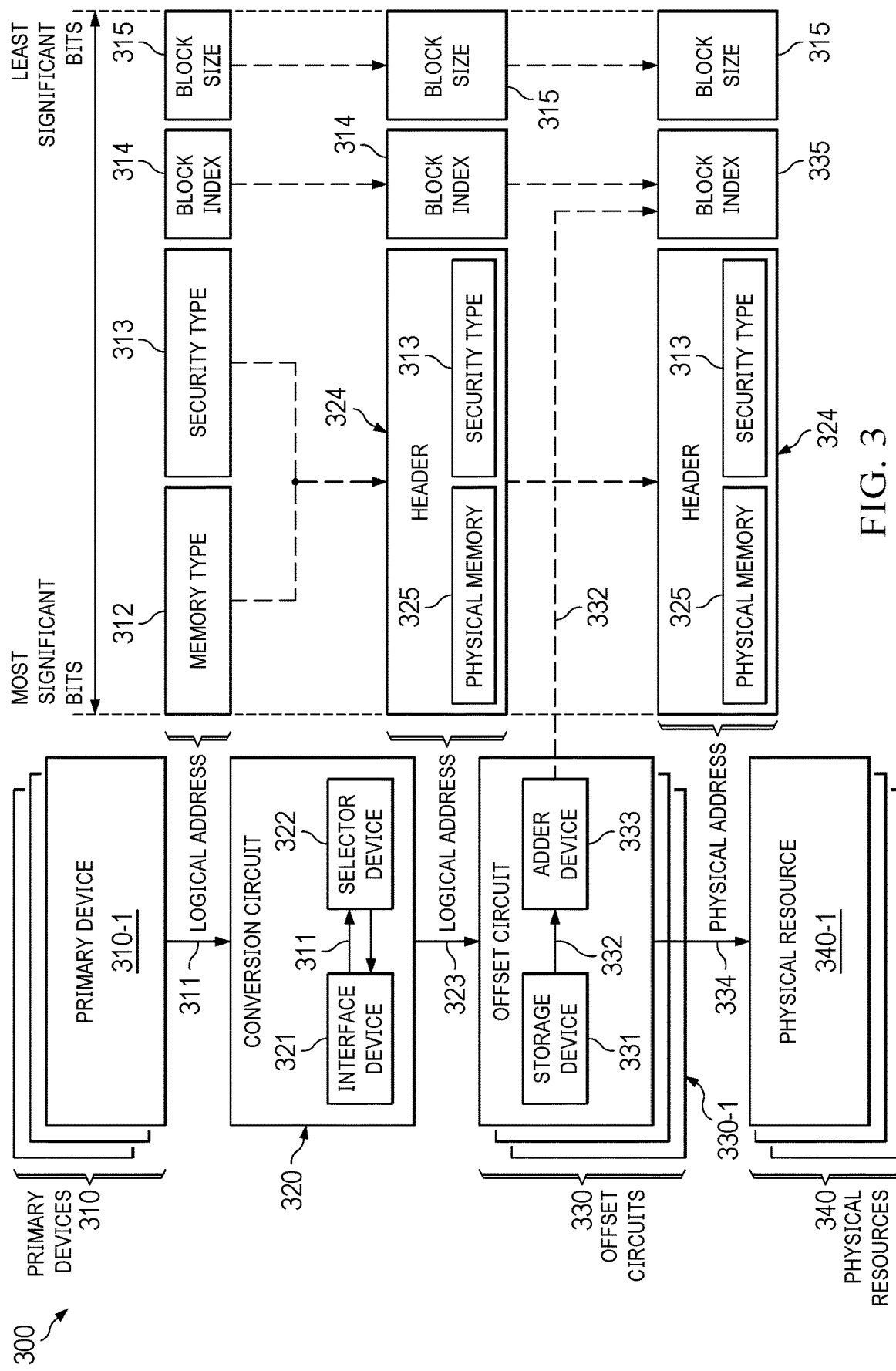
FIG. 3 illustrates an example operating environment configurable to map logical addresses to physical addresses in an implementation.

FIG. 3 illustrates an example operating environment configurable to map logical addresses to physical addresses in an implementation. FIG. 3 includes operating environment 300, which includes primary devices 310, conversion circuit 320, offset circuits 330, and physical resources 340. Conversion circuit 320 further includes interface device 321 and selector device 322. Offset circuit 330-1 is an individual offset circuit of offset circuits 330, which includes adder device 333 and storage device(s) 331. In various examples, conversion circuit 320 and offset circuits 330 may perform address space mapping processes, such as process 200 of FIG. 2.

In various embodiments, primary devices 310 may be representative of one or more computing devices capable of executing program instructions from physical resources 340 in accordance with application code. Physical resources 340 may include one or more memory devices (e.g., ROM, RAM, flash memory), hardware components (e.g., hardware accelerators, peripherals), and the like. Examples of primary devices 310 may include one or more processors or processing cores (e.g., a CPU), a direct memory access (DMA) controller, or the like. When primary device 310-1, one of primary devices 310, attempts to access a location in physical resources 340 in executing the program instructions, primary device 310-1 may generate logical address 311 and provide logical address 311 to conversion circuit 320.

Logical address 311 may include a number of bits indicative of information about primary device 310-1, the resource or memory that primary device 310-1 is attempting to access (physical resource 340-1), and code or data. More specifically, logical address 311 may include memory type 312, security type 313, block index 314, and block size 315, which may be implemented from most significant bits to least significant bits in that order (e.g., as illustrated in FIG. 3). Memory type 312 may refer to a type or name of physical resource 340-1. Security type 313 may refer to a type of security or authorization required related to the access of physical resource 340-1, such as secure or non-secure, among other types.

Block index 314 may refer to bits indicative of data or code related to the program instructions that primary device 310-1 is executing from physical resource 340-1. Block size 315 may refer to a size of block index 314.

In various embodiments, conversion circuit 320 may be representative of a hardware accelerator, including various hardware components, logic devices, and the like, such as interface device 321 and selector device 322. Interface device 321 may be configured to interface with primary device 310-1 to receive logical address 311 from primary device 310-1. Interface device 321 may provide logical address 311 (or a portion thereof, such as the portions of the logical address including the memory type 312 and security type 313) to selector device 322. In some embodiments, just the most significant bits (MSBs) of the logical address 311 that include the memory type 312 and security type 313 may be provided to selector device 322. Selector device 322 may be representative of a logic device, such as a splitter or multiplexer. Selector device 322 may be configured to identify memory type 312 and security type 313 of logical address 311, create header 324 based on memory type 312 and security 313 for use in an updated logical address 323, and select an offset circuit (e.g., offset circuit 330-1) of offset circuits 330 based on header 324. Logical address 323 may include header 324, block index 314, and block size 315, e.g., from MSBs to LSBs.

Accordingly, block index 314 and block size 315 may remain unchanged at this point. In some embodiments, header 324 may further include physical memory indication 325 and security type 313 (or an indication thereof). Physical memory indication 325 may indicate a physical memory, or location thereof, of physical resource 340-1. Selector device 322 may provide an indication of the selected offset circuit to interface device 321, and in response, interface device 321 may provide logical address 323 to offset circuit 330-1.

Although header 324 is illustrated as having physical memory indication 325 in the MSBs of header 324 and security type 313 (or an indication thereof) in the LSBs of header 324, other arrangements are also possible. For example, in some embodiments, physical memory indication 325 may be in the LSBs of header 324 and security type 313 in the MSBs of header 324. In some embodiments, bits of physical memory indication 325 and of security type 313 (or an indication thereof) may be interspersed in header 324.

Offset circuits 330 may be representative of hardware accelerators, including various hardware components, logic devices, storage, and the like. Each of offset circuits 330 may correspond to one of physical resources 340. In this example, offset circuit 330-1 represents an individual one of offset circuits 330 that includes storage device 331 and adder device 333 and corresponds to physical resource 340-1. Storage device 331 may be representative of a memory or other storage hardware device (e.g., a flip-flop), which may include one or more offset values applicable to logical address 323 provided by conversion circuit 320. In some embodiments, adder device 333 may be representative of a summation device, an adder logic device, a subtraction device, or any other hardware device capable of adding or subtracting at least a first value to a second value. In operation, adder device 333 may identify or otherwise be provided with offset value 332 based on header 324 of logical address 323 provided by conversion circuit 320. Adder device 333 may obtain offset value 332 from storage device 331 and add offset value 332 to block index 314 of logical device 323 to generate block index 335. Accordingly, block index 335 may include an offset portion of logical address 323. In some embodiments, block index 314 bypasses conversion circuit 320 and is extracted from logical address 311 by the offset circuit 330-1. Header 324, block index 335, and block size 315, organized from MSBs to LSBs, may be referred to now as physical address 334. Header 324 may be directly mapped from header 324 of logical address 323. Block size 315 may remain unchanged from logical address 311 to logical address 323 to physical address 334. Block index 314 may include all of block index 314 offset by offset value 332. Offset circuit 330-1 may provide physical address 334 to physical resource 340-1. Using physical address 334, primary device 310-1 may be able to access physical resource 340-1, or a range of memory thereof based on physical memory indication 325.

Figure 4:
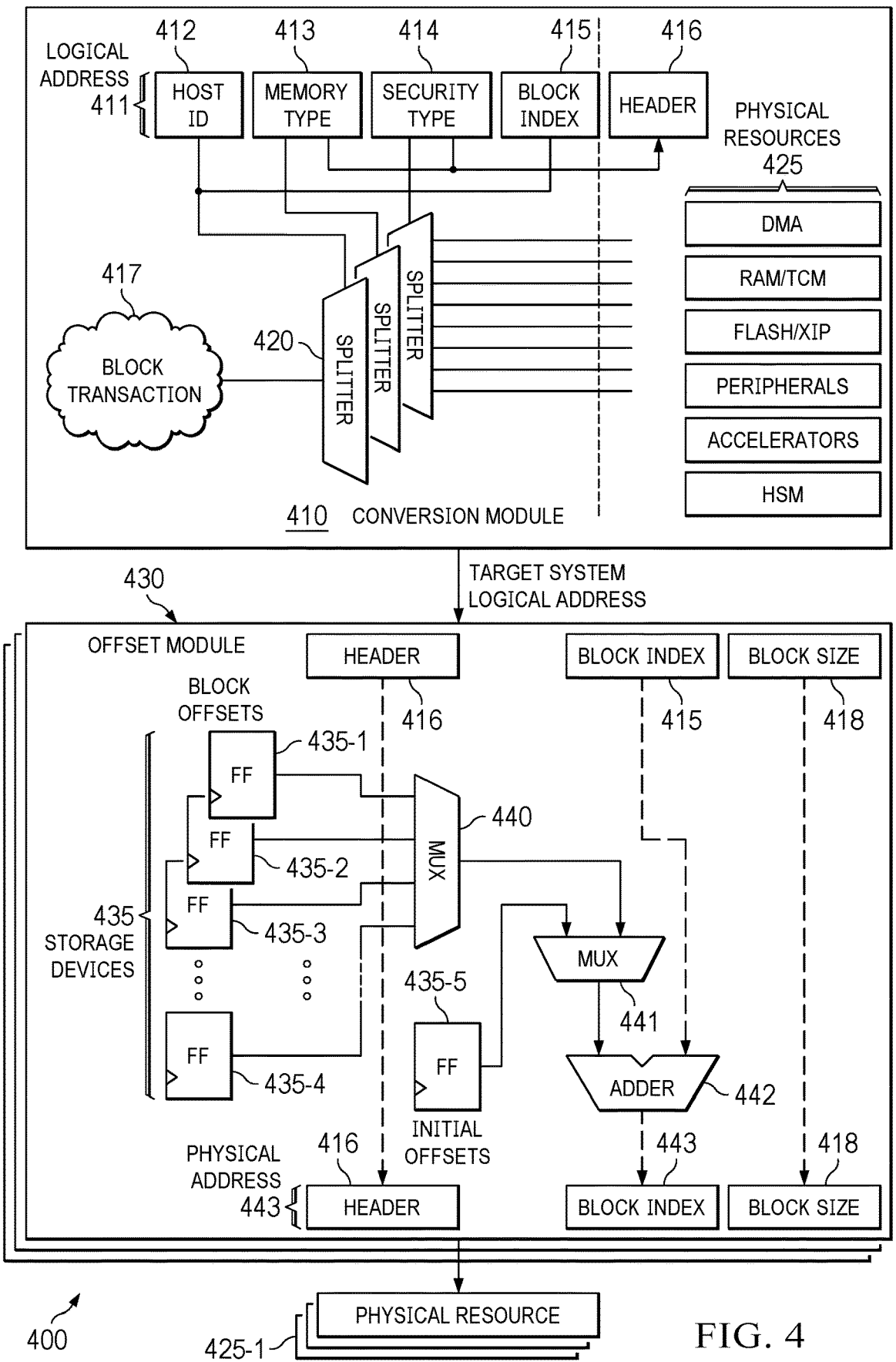
FIG. 4 illustrates an example block diagram of components used in an address mapping system in an implementation.

FIG. 4 illustrates an example block diagram of components used in an address mapping system in an implementation. FIG. 4 includes conversion module 410 and offset module 430. Conversion module 410 further includes splitters 420. Offset module 430 further includes storage devices 435, multiplexer (MUX) 440, MUX 441, and adder 442. Conversion module 410 and offset module 430 may be representative of elements of an address mapping system, such as conversion circuit 111 and offset circuits 112 of FIG. 1, respectively, and conversion circuit 320 and offset circuit 330-1 of FIG. 3, respectively.

In various embodiments, conversion module 410 may be representative of a hardware accelerator, including various hardware components, logic devices, and the like, such as splitters 420. Conversion module 410 may receive logical address 411 and block transaction 417 from a processor, DMA controller, or other computing device (e.g., primary devices 105 of FIG. 1) (not shown in FIG. 4). Logical address 411 may include a number of bits indicative of information about the processor that sent logical address 411, the physical resource that the processor is attempting to access (physical resource 425-1), and code or data. More specifically, in some embodiments, logical address 411 may include host ID 412, memory type 413, security type 414, and block index 415 (e.g., in that order, from MSB to least significant bit (LSB), in some embodiments). In some embodiments, logical address 411 may not include host ID 412, but rather, host ID 412 may be provided by a primary device separately or in conjunction with logical address 411. Host ID 412 may indicate the device that provided logical address 411. Memory type 413 may indicate a type or name of one or more of physical resources 425. Security type 414 may indicate a type of security or authorization required related to the access of physical resources 425, such as secure or non-secure, among other types. Block index 415 may refer to bits indicative of data or code related to the program instructions that the device is executing from the one or more of physical resources 425. Conversion module 410 may determine header 416 based on memory type 413 and security type 414. Conversion module 410 may further determine to which offset module 430 to provide header 416 based on a comparison of information in logical address 411 via splitters 420.

In various embodiments, splitters 420 may include multiple splitter devices, each including one or more comparators internal to the splitter device. In some embodiments, splitters 420 may be associated with a single primary device. In other embodiments, splitters 420 may be associated with multiple primary devices. Splitters 420 may receive logical address 411 from a primary device and identify information from logical address 411, such as host ID 412, memory type 413, security type 414, and block index 415. In an example, a first splitter device may receive host ID 412, block index 415, and block transaction 417 to determine the starting and ending addresses requested by the processing device. A second splitter device may receive memory type 413. A third splitter device may receive security type 414. Based on each input, splitters 420 may determine to which physical resource of physical resources 425 logical address 411 relates. Based on the determined physical resource, conversion module 410 can identify a corresponding offset module (offset module 430) and provide header 416 to the offset module.

Offset module 430 may be representative of one of several hardware accelerators, including various hardware components, logic devices, storage, and the like. In this example, offset circuit 430 includes storage device 435, MUX 440, MUX 441, and adder 442. Storage devices 435 may be representative of logic storage devices, such as flip-flops, which may each include one or more offset values applicable to logical address 411 provided by conversion module 410. As illustrated in this example, offset module 430 includes storage devices 435-1, 435-2, 435-3, 435-4, and 435-5. Storage devices 435-1, 435-2, 435-3, and 435-4 may store offset values corresponding to physical resource 425-1. Each of these storage devices may provide an offset value to MUX 440. Storage device 435-5 may store an initial offset value that may be applied instead of or in addition to an offset value from one of the other storage devices 435. Storage device 435-5 may provide the initial offset value to MUX 441. MUX 440 may be configured to select an offset value from one of storage devices 435 and provide the selected offset value to MUX 441. MUX 441 may select either the selected offset value or the initial offset value and provide the offset value to adder 442.

Adder 442 may be a summation or subtraction logic device configured to add block index 415 and an offset value to create block index 444. Using header 416, block index 444, and block size 418, offset module 430 can generate physical address 443. Physical address 443 may include a set of bits, including header 416, block index 444, and block size 418, that correspond to a physical memory location of physical resource 425-1. Accordingly, as the processing device executes program instructions, offset module 430 can provide the processing device with access to physical resource 425-1 using the physical address.

In various examples, storage devices 435 may be updated with different offset values. It follows that block index 415 may be used to form different offset block indices based on the value of storage devices 435, which may provide access to different memory locations or addresses in a physical resource at different times. Additionally, or alternatively, the operation of splitters 420 may be updated, e.g., using signals from digital logic, to generate different headers 416, e.g., to select different physical resources 425 based on portions of logical address 411. For example, splitters 420 may use different header translation logic to generate header 416 based on bits of the logical address and/or an external input, such as another bit(s) or signal(s). Such features may be advantageous, for example, when remapping the same set of logical address to a different physical address, such as for a live firmware update. Similarly, memory storage associated with conversion module 410 for generating header 416 may also be updated to access different memory location or addresses in the same or different physical resource at different times.

Figure 5:
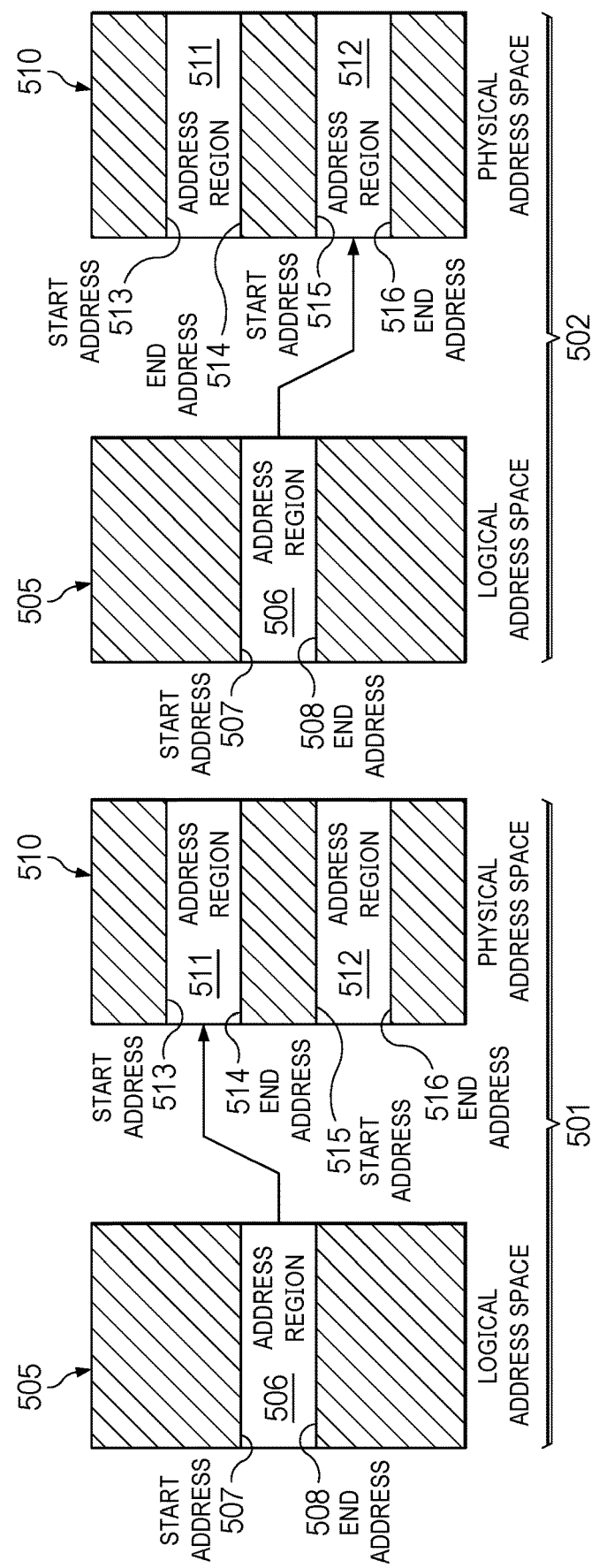
FIG. 5 illustrates example address mapping scenarios in accordance with an implementation.

FIG. 5 illustrates example address mapping scenarios in accordance with an implementation. FIG. 5 includes scenario 501, which illustrates logical address space 505 and physical address space 510 at a first time and scenario 502, which illustrates logical address space 505 and physical address space 510 at a second time different relative to the first time. In various examples, scenarios 501 and 502 represent examples of mapping logical addresses to physical addresses using address mapping components, such as conversion circuit 111 and offset circuit 112 of FIG. 1, conversion circuit 320 and offset circuits 330 of FIG. 3, and/or conversion module 410 and offset module 430 of FIG. 4.

Logical address space 505 may be representative of an address space of virtual addresses created by a processor (e.g., primary device 105 of FIG. 1) when executing program instructions. Logical address space 505 may include address region 506, or a range of addresses (from start address 507 to end address 508) in logical address space 505, that the processor may attempt to write to or read from with respect to a physical resource (e.g., one of physical resources 120 of FIG. 1). More specifically, address region 506 may be identified by a logical address (e.g., logical address 311 of FIG. 3) created by the processor, which may include a security type, a memory type, a block index, and more. The security type may indicate whether the processor is attempting to access the physical resource in a secure or non-secure way. The memory type may indicate the physical resource that the processor attempts to access. The block index may include a set of bits corresponding to code or data.

Physical address space 510 may be representative of an address space of physical addresses associated with memory locations in a physical resource. In this example, physical address space 510 may include address regions 511 and 512. Address region 511 may include a first range of addresses (from start address 513 to end address 514) in physical address space 510 available to the processor, while address region 512 may include a second range of addresses (from start address 515 to end address 516) in physical address space 510, different from the first range of addresses, that may also be available to the processor.

In scenario 501, an address mapping system (e.g., mapping circuit 110 of FIG. 1) may map address region 506 of logical address space 505 to address region 511 of physical address space 510. In various examples, this may be achieved by applying a first offset value to a block in address region 506 (i.e., the block index) to create an offset portion in the logical address (e.g., so that start address 507 corresponds to start address 513). Based on the offset value, the address mapping system can create a physical address from the logical address, which can correspond to address region 511. In some embodiments, there is direct mapping between address region 506 and address region 511 (e.g., logical address 323 to physical address 334 as demonstrated in FIG. 3), where the start address 507 of address region 506 corresponds to the start address 513 of address region 511, and where, start address 507+i corresponds to start address 513+i, where i is a non-negative integer between 0 and end address 508 minus start address 507.

At a second time, in scenario 502, the address mapping system may map address region 506 of logical address space 505 to address region 512 of physical address space 510. To achieve this, the address mapping system may apply a second offset value (e.g., by updating the content stored in storage devices 435 and/or selecting a different offset, e.g., using MUX 440 and/or MUX 441 of FIG. 4) to the block in address region 506 to create a second offset portion in the logical address. The second offset value may lead to a different physical address corresponding to address region 512 instead of address region 511 (e.g., so that start address 507 corresponds to start address 515). Accordingly, in some embodiments, address region 511 may be de-allocated from use by the processor, and address region 512 may be re-allocated in place of address region 511. Advantageously, by applying different offset values to the logical address of address region 506, different address regions of physical address space 510 may be used at different times during execution of program instructions (i.e., runtime).

Figure 6:
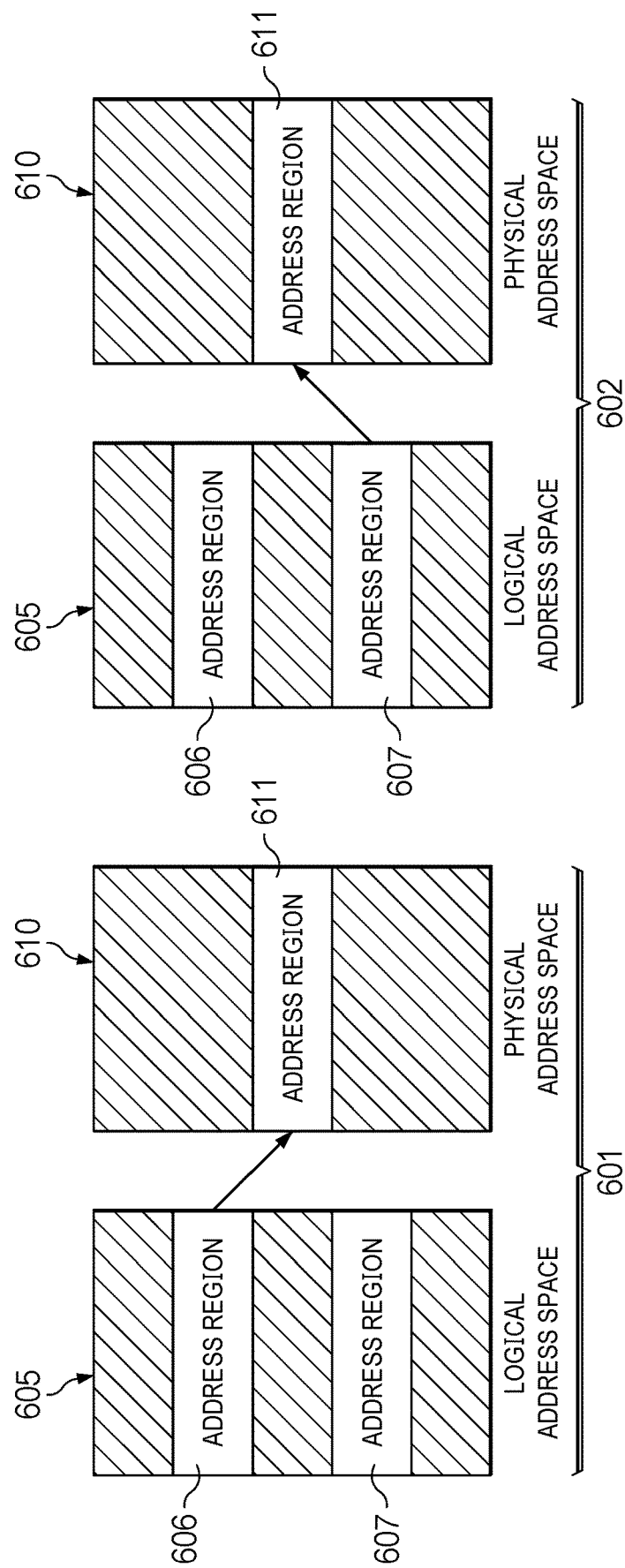
FIG. 6 illustrates example address mapping scenarios in accordance with an implementation.

FIG. 6 illustrates example address mapping scenarios in accordance with an implementation. FIG. 6 includes scenario 601, which illustrates logical address space 605 and physical address space 610 at a first time and scenario 602, which illustrates logical address space 605 and physical address space 610 at a second time different relative to the first time. In various examples, scenarios 601 and 602 represent examples of mapping logical addresses to physical addresses using address mapping components, such as conversion circuit 111 and offset circuit 112 of FIG. 1, conversion circuit 320 and offset circuits 330 of FIG. 3, and/or conversion module 410 and offset module 430 of FIG. 4.

Logical address space 605 may be representative of an address space of virtual addresses created by a processor (e.g., one of primary devices 105 of FIG. 1) when executing program instructions. Logical address space 605 may include address regions 606 and 607, or ranges of addresses in logical address space 605, that the processor may attempt to write to or read from with respect to a physical resource (e.g., one of physical resources 120 of FIG. 1). More specifically, address regions 606 or 607 may be identified by a logical address (e.g., logical address 311 of FIG. 3) created by the processor, which may include a security type, a memory type, a block index, and more. The security type may indicate whether the processor is attempting to access the physical resource in a secure or non-secure way. The memory type may indicate the physical resource that the processor attempts to access. The block index may include a set of bits corresponding to code or data.

Physical address space 610 may be representative of an address space of physical addresses associated with memory locations in a physical resource. In this example, physical address space 610 may include address region 611. Address region 611 may include a range of addresses in physical address space 610 available to the processor.

In scenario 601, a processor may attempt to access a physical resource using a logical address corresponding to address region 606. An address mapping system (e.g., mapping circuit 110 of FIG. 1) may map address region 606 of logical address space 605 to address region 611 of physical address space 610 by applying a first offset value to a block in address region 606 (i.e., the block index) to create an offset portion in the logical address. Based on the offset value, the address mapping system can create a physical address from the logical address, which can correspond to address region 611.

At a second time, in scenario 602, the processor may attempt to access address region 611 using a different logical address corresponding to address region 607. The address mapping system may map address region 607 to address region 611 by applying a second offset value (e.g., by updating the content stored in storage devices 435 and/or selecting a different offset, e.g., using MUX 440 and/or MUX 441 of FIG. 4) to a block in address region 607 to create a second offset portion in the logical address.

Figure 7:
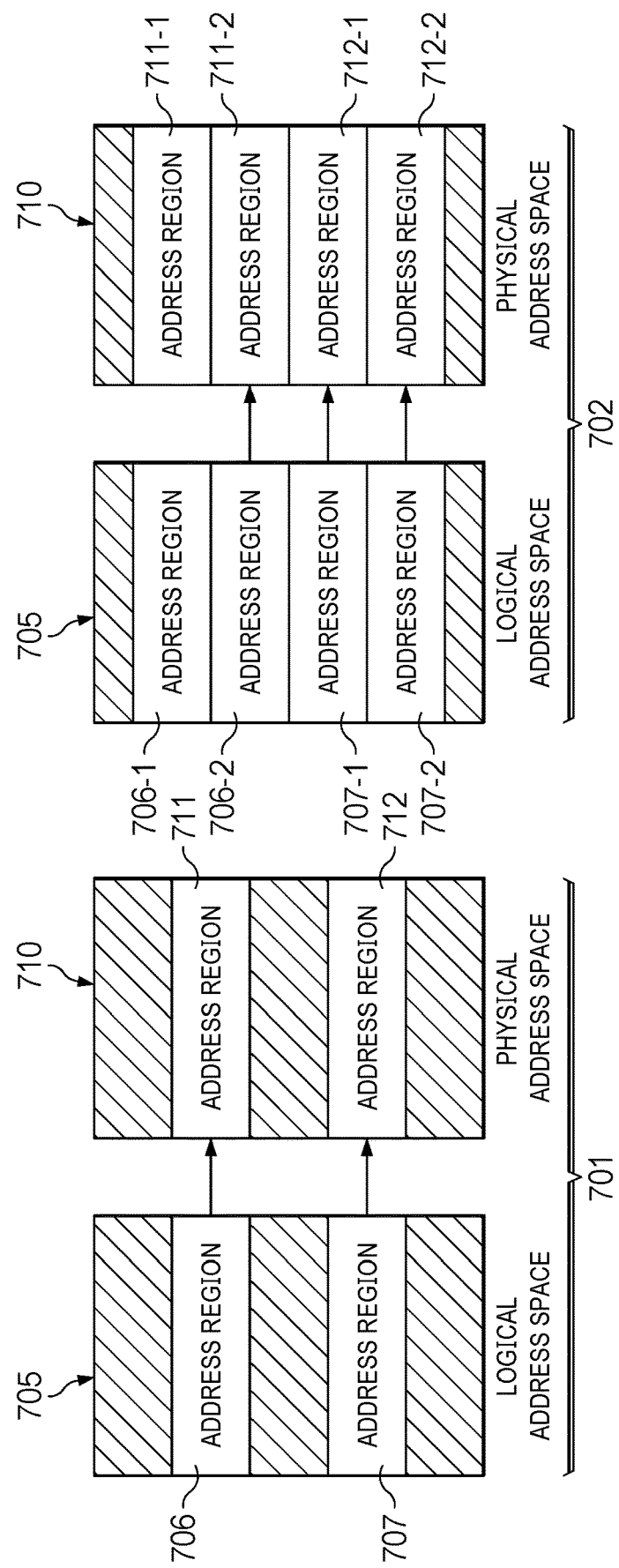
FIG. 7 illustrates example address mapping scenarios in accordance with an implementation.

FIG. 7 illustrates example address mapping scenarios in accordance with an implementation. FIG. 7 includes scenario 701, which illustrates logical address space 705 and physical address space 710 at a first time and scenario 702, which illustrates logical address space 705 and physical address space 710 at a second time different relative to the first time. In various examples, scenarios 701 and 702 represent examples of mapping logical addresses to physical addresses using address mapping components, such as conversion circuit 111 and offset circuit 112 of FIG. 1, conversion circuit 320 and offset circuits 330 of FIG. 3, and/or conversion module 410 and offset module 430 of FIG. 4.

Logical address space 705 may be representative of an address space of virtual addresses created by a processor (e.g., primary devices 105 of FIG. 1) when executing program instructions. Logical address space 705 may include address regions 706 and 707, or ranges of addresses in logical address space 705, that the processor may attempt to write to or read from with respect to a physical resource (e.g., one of physical resources 120 of FIG. 1). More specifically, address regions 706 or 707 may be identified by a logical address (e.g., logical address 311 of FIG. 3) created by the processor, which may include a security type, a memory type, a block index, and more. The security type may indicate whether the processor is attempting to access the physical resource in a secure or non-secure way. The memory type may indicate the physical resource that the processor attempts to access. The block index may include a set of bits corresponding to code or data.

Physical address space 710 may be representative of an address space of physical addresses associated with memory locations in a physical resource. In this example, physical address space 710 may include address regions 711 and 712. Address regions 711 and 712 may include ranges of addresses in physical address space 710 available to the processor.

In scenario 701, a processor may attempt to access a physical resource using logical addresses corresponding to address regions 706 and 707. An address mapping system (e.g., mapping circuit 110 of FIG. 1) may map address region 706 of logical address space 705 to address region 711 of physical address space 710 by applying a first offset value to a block in address region 706 (i.e., the block index) to create an offset portion in the logical address. Additionally, the address mapping system may map address region 707 to address region 712 by applying a second offset value to a block in address region 707. Based on the offset values, the address mapping system can create physical addresses from the logical addresses, which can correspond to address regions 711 and 712.

At a second time, in scenario 702, the processor may attempt to access the physical resource using different logical addresses corresponding to address region 706. In this example, address region 706 is shown split into two regions: address region 706-1 and address region 706-2. Address region 706-1 may include a first set of addresses in address region 706 while address region 706-2 may include a second set of addresses in address region 706 different from address region 706-1. Additionally, address region 711 is shown split into two regions: address region 711-1 and 711-2. Address region 711-1 may include a first set of addresses in address region 711 while address region 711-2 may include a second set of addresses in address region 711 different from address region 711-1. The address mapping system may identify that address region 711-1 is no longer available for use by the processor. Thus, the address mapping system may de-allocate address region 711-1 from address region 706-1 and re-allocate address region 711-2 for use with address region 706-2.

Figure 8:
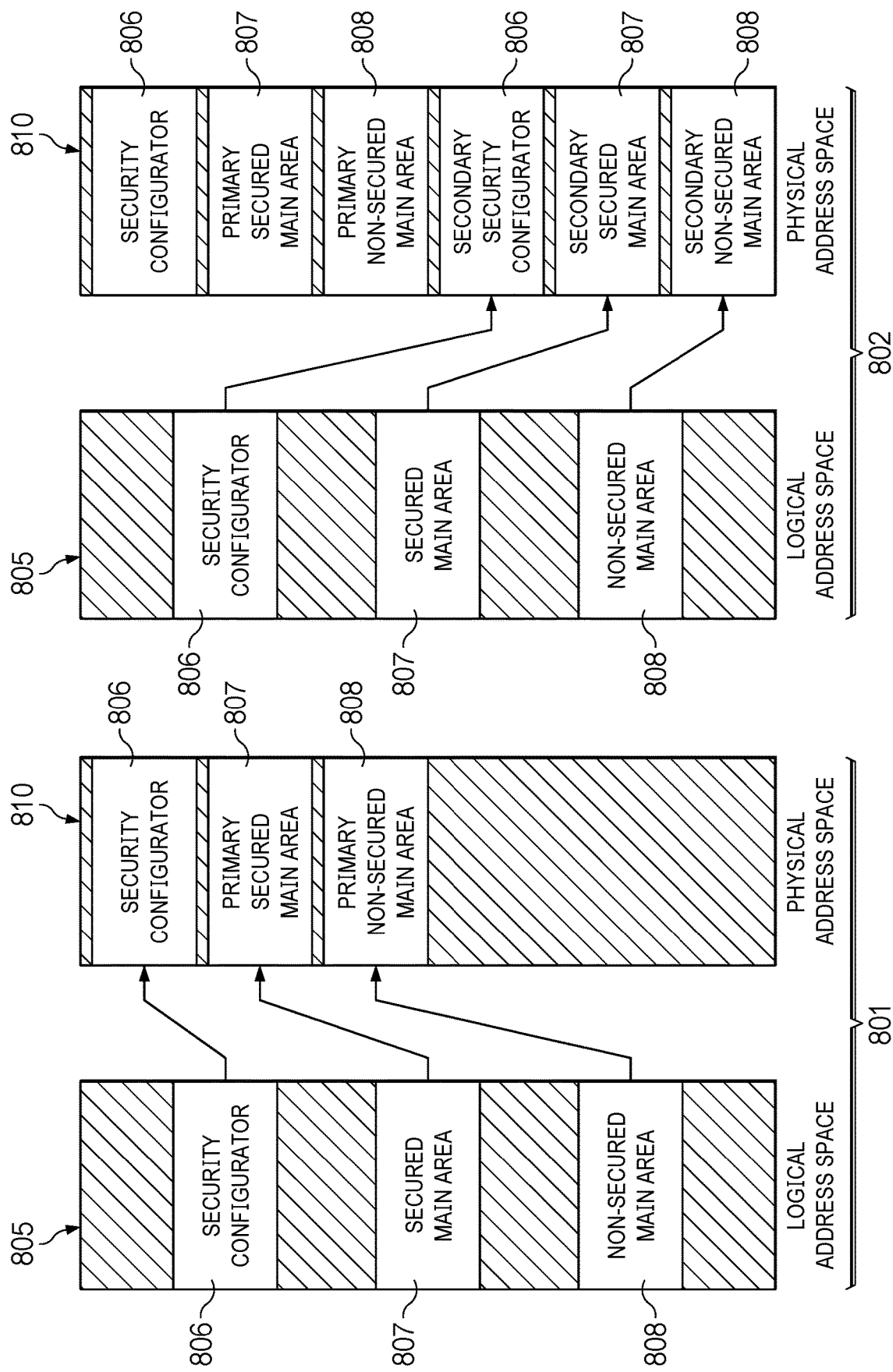
FIG. 8 illustrates example address mapping scenarios in accordance with an implementation.

FIG. 8 illustrates example address mapping scenarios in accordance with an implementation. FIG. 8 includes scenario 801, which illustrates logical address space 805 and physical address space 810 at a first time and scenario 802, which illustrates logical address space 805 and physical address space 810 at a second time different relative to the first time. In various examples, scenarios 801 and 802 represent examples of mapping logical addresses to physical addresses using address mapping components, such as conversion circuit 111 and offset circuit 112 of FIG. 1, conversion circuit 320 and offset circuits 330 of FIG. 3, and/or conversion module 410 and offset module 430 of FIG. 4.

Logical address space 805 may be representative of an address space of virtual addresses created by a processor (e.g., primary devices 105 of FIG. 1) when executing program instructions. Logical address space 805 may include security configurator 806, secured main area 807, and non-secured main area 808. Each may include different ranges of addresses and different code and data relative to one another. For example, security configurator 806 may include code and/or data related to security configuration associated with a first logical address. Secured main area 807 may include code and/or data that is secure, or firewall protected by the processor, associated with a second logical address. Non-secured main area 808 may include code and/or data that is not secure, or not subject to firewall protection by the processor, associated with a third logical address.

Physical address space 810 may be representative of an address space of physical addresses associated with memory locations in a physical resource. In this example, physical address space 810 may include security configurator 811, primary secured main area 812, and primary non-secured main area 813. Security configurator 811 may represent locations in memory of a physical resource dedicated to security configuration code and/or data. Primary secured main area 812 may represent locations in memory of a physical resource dedicated to secure code and/or data. Primary non-secured main area 813 may represent locations in memory of a physical resource dedicated to non-secure code and/or data.

In scenario 801, a processor may attempt to access a physical resource using logical addresses corresponding to security configurator 806, secured main area 807, and non-secured main area 808. An address mapping system (e.g., mapping circuit 110 of FIG. 1) may map security configurator 806 to security configurator 811, secured main area 807 to primary secured main area 812, and non-secured main area 808 to primary non-secured main area 813.

At a second time, in scenario 802, the processor may attempt to access the physical resource again using logical addresses corresponding to security configurator 806, secured main area 807, and non-secured main area 808. At this time, however, the address space mapping system may apply offset values to blocks of each of the logical addresses in logical address space 805, which can cause security configurator 806 to be mapped to secondary security configurator 814, secured main area 807 to be mapped to secondary secured main area 815, and non-secured main area 808 to be mapped to secondary non-secured main area 816.

By way of example, FIG. 8 may illustrate different physical entities running code and may illustrate a live firmware update (LFU). For example, a high-availability system is a computer system that satisfies a maximum downtime requirement, such as a number of minutes per day that the computer system can be offline. Some high-availability systems are required to be available twenty-four hours a day, seven days a week. Irrespective of whether a small amount of downtime or no downtime at all is tolerable, it is useful to perform maintenance of the high-availability system such that the system downtime requirement is satisfied. Examples of high-availability systems include telecommunications servers, and server power supply units (PSUs).

A LFU is one kind of maintenance that is performed on high-availability systems to update an old version of firmware to a new version of firmware. The firmware can also be referred to at times as an application, or application firmware for simplicity. An LFU switchover refers to the process of updating the old version of the firmware to the new version of the firmware. In some cases, an extent or a magnitude of firmware changes (e.g., a delta or difference between an old firmware version and a new firmware version, such as new variables to be initialized, number of new function pointers, and the like) during the LFU switchover is limited by a duration of an idle window between interrupt service routine (ISR) windows (e.g., known or predetermined periods of time in which interrupts can be serviced).

By way of example, scenario 801 may represent a first time where a processor is executing firmware on a physical resource at security configurator 811, primary secured main area 812, and primary non-secured main area 813. Scenario 802 may represent a second time where the processor is executing an updated version of the firmware on the same or a different physical resource at secondary security configurator 814, secondary secured main area 815, and secondary non-secured main area 816. In various examples, both scenarios 801 and 802 may occur during runtime operations of a system and may represent different physical entities executing code at different times. Therefore, in the context of firmware updates, live firmware updates may be made in different address regions (i.e., secondary security configurator 814, secondary secured main area 815, and secondary non-secured main area 816) relative to the address regions the processor may currently be executing firmware (i.e., security configurator 811, primary secured main area 812, and primary non-secured main area 813) and applied by switching the mapping of logical addresses to physical addresses from the current address regions to the different address regions during runtime using the address space mapping system. In some embodiments, causing mapping circuit 110 to remap an address space to a different resource and/or location (e.g., by updating storage associated with conversion circuit 111 and/or offset circuits 112, and/or by causing the selection of different offset and/or header conversion configuration) occurs within 1 clock cycle, thereby reducing or eliminating the time in which the system is unable to service interrupts. This may be referred to as a "hot start" or "hot swap" of physical resources as no reset is performed and code continues to execute, e.g., without interruption, and interrupts continue to be serviced (e.g., by an ISR), e.g., without interruptions. In some embodiments, little to no idle time is required to switch from one physical resource to another physical resource, or from one location in a physical resource to another location in the physical resource, to apply firmware updates. Additional example details of live firmware updates using logical address remapping, and components thereof, can be found in commonly assigned U.S. patent application Ser. No. 18/340,993 (the "'993 Application"), entitled "FIRMWARE UPDATE WITH LOGICAL ADDRESS REMAPPING," filed on Jun. 26, 2023, and associated with, which is hereby incorporated by reference in its entirety. For example, embodiments disclosed in the '993 Application may be implemented using mapping circuit 110 as the memory mapper 120 of the '993 Application, e.g., with the SWAP signal 115 of the '993 Application controlling configuration of the conversion module 410 and/or configuration of offset modules 430 (e.g., the selection of MUX 440 and/or MUX441).

In some embodiments, in scenario 801, the mapping illustrated may correspond to running code from ROM (e.g., the physical address space 810 is a ROM address space) while, in scenario 802, the mapping illustrated may correspond to running code from RAM (e.g., the physical address space 810 is a RAM address space).

Figure 9:
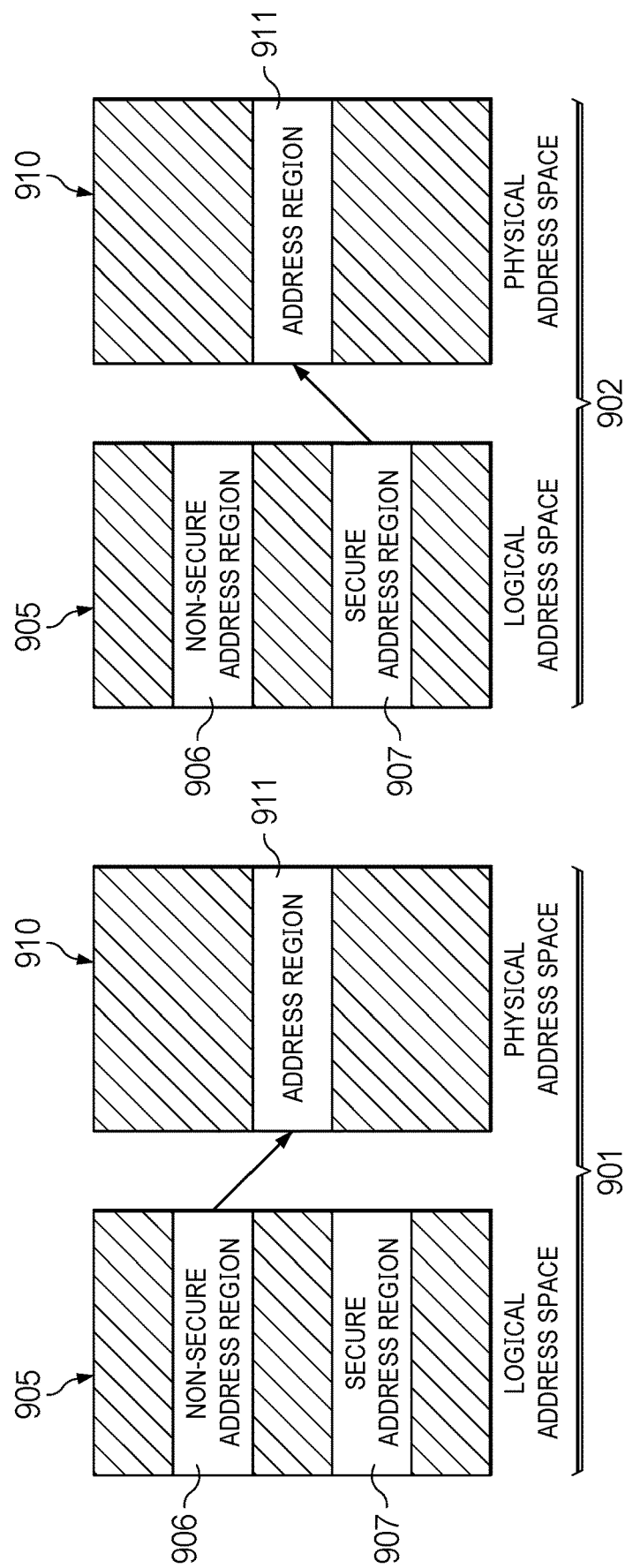
FIG. 9 illustrates example address mapping scenarios in accordance with an implementation.

FIG. 9 illustrates example address mapping scenarios in accordance with an implementation. FIG. 9 includes scenario 901, which illustrates logical address space 905 and physical address space 910 at a first time and scenario 902, which illustrates logical address space 905 and physical address space 910 at a second time different relative to the first time. In various examples, scenarios 901 and 902 represent examples of mapping logical addresses to physical addresses using address mapping components, such as conversion circuit 111 and offset circuit 112 of FIG. 1, conversion circuit 320 and offset circuits 330 of FIG. 3, and/or conversion module 410 and offset module 430 of FIG. 4.

Logical address space 905 may be representative of an address space of virtual addresses created by a processor (e.g., primary devices 105 of FIG. 1) when executing program instructions. Logical address space 905 may include non-secure address region 906 and secure address region 907, each of which may include ranges of addresses in logical address space 905 that the processor may attempt to write to or read from with respect to a physical resource (e.g., one of physical resources 120 of FIG. 1). More specifically, non-secure address region 906 may include a range of address usable by the processor related to non-secure code and/or data. Secure address region 907 may include a different range of addresses usable by the processor related to secure code and/or data.

Physical address space 910 may be representative of an address space of physical addresses associated with memory locations in a physical resource. In this example, physical address space 910 may include address region 911. Address region 911 may include a range of addresses in physical address space 910 available to the processor.

In scenario 901, a processor may attempt to access a physical resource using a logical address corresponding to non-secure address region 906. An address mapping system (e.g., mapping circuit 110 of FIG. 1) may map non-secure address region 906 of logical address space 905 to address region 911 of physical address space 910 by applying a first offset value to a block in non-secure address region 906 (i.e., a block index) to create an offset portion in the logical address. Based on the offset value, the address mapping system can create a physical address from the logical address, which can correspond to address region 911.

At a second time, in scenario 902, the processor may attempt to access the physical resource using a different logical address corresponding to secure address region 907. The address mapping system may map address secure region 907 to address region 911 by applying a second offset value to a block in secure address region 907 to create a second offset portion in the logical address.

These scenarios shown and described in FIG. 9 may demonstrate that a physical resource may be accessed via a secured logical address (i.e., secure address region 907) following successful authorization of the secured logical address and following access to the physical resource using the non-secured logical address (i.e., non-secure address region 906).

Importantly, this may allow for physical resource ownership control using reallocation methods of logical addresses by the address mapping system.

Figure 10:
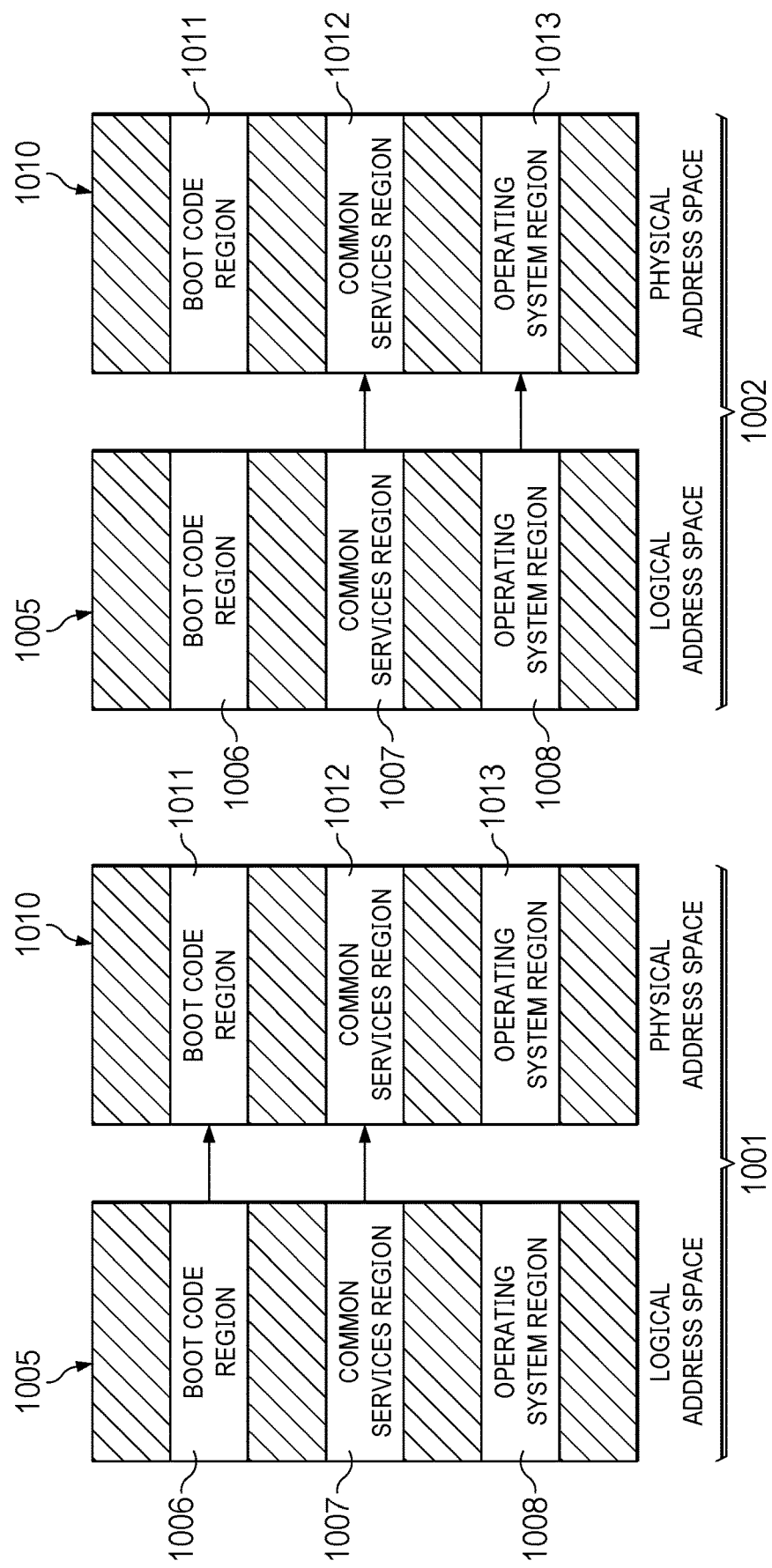
FIG. 10 illustrates example address mapping scenarios in accordance with an implementation.

FIG. 10 illustrates example address mapping scenarios in accordance with an implementation. FIG. 10 includes scenario 1001, which illustrates logical address space 1005 and physical address space 1010 at a first time and scenario 1002, which illustrates logical address space 1005 and physical address space 1010 at a second time different relative to the first time. In various examples, scenarios 1001 and 1002 represent examples of mapping logical addresses to physical addresses using address mapping components, such as conversion circuit 111 and offset circuit 112 of FIG. 1, conversion circuit 320 and offset circuits 330 of FIG. 3, and/or conversion module 410 and offset module 430 of FIG. 4.

Logical address space 1005 may be representative of an address space of virtual addresses created by a processor (e.g., primary devices 105 of FIG. 1) when executing program instructions, such as boot code and operating code. Logical address space 1005 may include boot code region 1006, common services region 1007, and operating system region 1008, or ranges of addresses in logical address space 1005, that the processor may attempt to write to or read from with respect to a physical resource (e.g., one of physical resources 120 of FIG. 1). More specifically, boot code region 1006, common services region 1007, and operating system region 1008 may be identified by a logical address (e.g., logical address 311 of FIG. 3) created by the processor. Boot code region 1006 may include a range of addresses related to boot code, common services region 1007 may include a range of addresses related to common services of a system, and operating system region 1008 may include a range of addresses related to operating code.

Physical address space 1010 may be representative of an address space of physical addresses associated with memory locations in a physical resource. In this example, physical address space 1010 may include boot code region 1011, common services region 1012, and operating system region 1013. Boot code region 1011 may include a range of addresses related to boot code, common services region 1012 may include a range of addresses related to common services of a system, and operating system region 1013 may include a range of addresses related to operating code.

In scenario 1001, a processor may attempt to access a physical resource using logical addresses corresponding to boot code region 1006 and common services region 1007 during a boot sequence of a computing system (e.g., a microcontroller unit). An address mapping system (e.g., mapping circuit 110 of FIG. 1) may map boot code region 1006 to boot code region 1011 and common services region 1007 to common services region 1012.

Accordingly, the processor may be granted access to boot code region 1011 and common services region 1012 via the address mapping system.

In scenario 1002, the processor may attempt to access the physical resource using different logical addresses corresponding to common services region 1007 and operating system region 1008 at a second time following the boot sequence, such as during an operating sequence of the computing system. The address mapping system (e.g., mapping circuit 110 of FIG. 1) may simultaneously, or sequentially, de-allocate boot code region 1011 of the physical resource and re-allocate operating system region 1013 for use by the processor corresponding to the logical address of operating system region 1008. Accordingly, the processor may be granted access to common services region 1012 and operating system region 1013 and may be restricted access to boot code region 1011 via the address mapping system. Advantageously, the address mapping system can provide seamless handoff transition of physical resource memory space between a boot sequence and an operating mode sequence.

Figure 11:
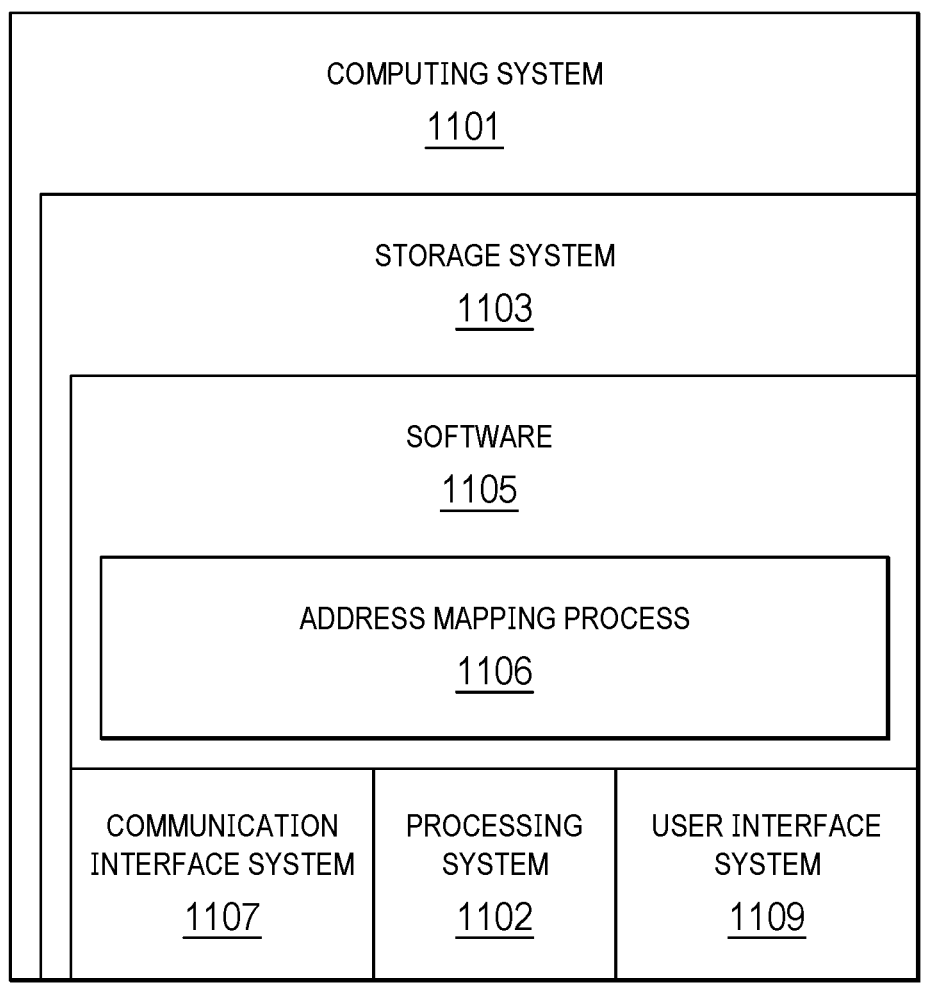
FIG. 11 illustrates an example computer system that may be used in an implementation.

FIG. 11 illustrates an example computer system that may be used in an implementation. FIG. 11 illustrates computing system 1101 to perform address space mapping according to an implementation of the present technology. In some embodiments, mapping circuit 110 may be implemented as computing system 1101. Computing system 1101 is representative of any system or collection of systems with which the various operational architectures, processes, scenarios, and sequences disclosed herein for memory access may be employed. Computing system 1101 may be implemented as a single apparatus, system, or device or may be implemented in a distributed manner as multiple apparatuses, systems, or devices. Computing system 1101 includes, but is not limited to, processing system 1102, storage system 1103, software 1105, communication interface system 1107, and user interface system 1109 (optional). Processing system 1102 is operatively coupled with storage system 1103, communication interface system 1107, and user interface system 1109. Computing system 1101 may be representative of a cloud computing device, distributed computing device, or the like.

Processing system 1102 loads and executes software 1105 from storage system 1103, or alternatively, runs software 1105 directly from storage system 1103. Software 1105 includes and implements address mapping process 1106, which is representative of any of the address space mapping, address allocation, address de-allocation, address re-allocation, and offset addition or revision processes discussed with respect to the preceding Figures. When executed by processing system 1102 to provide address space mapping functions, software 1105 directs processing system 1102 to operate as described herein for at least the various processes, operational scenarios, and sequences discussed in the foregoing implementations. Computing system 1101 may optionally include additional devices, features, or functionality not discussed for purposes of brevity.

Referring still to FIG. 11, processing system 1102 may comprise a micro-processor and other circuitry that retrieves and executes software 1105 from storage system 1103. Processing system 1102 may be implemented within a single processing device but may also be distributed across multiple processing devices or sub-systems that cooperate in executing program instructions. Examples of processing system 1102 include general purpose central processing units, graphical processing units, digital signal processing units, data processing units, application specific processors, and logic devices, as well as any other type of processing device, combinations, or variations thereof.

Storage system 1103 may comprise any computer readable storage media readable and writeable by processing system 1102 and capable of storing software 1105. Storage system 1103 may include volatile and nonvolatile, removable and non-removable, mutable and non-mutable media implemented in any method or technology for storage of information, such as computer readable instructions, data structures, program modules, or other data.

Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1103 may also include computer readable communication media over which at least some of software 1105 may be communicated internally or externally. Storage system 1103 may be implemented as a single storage device but may also be implemented across multiple storage devices or sub-systems co-located or distributed relative to each other. Storage system 1103 may comprise additional elements, such as a controller, capable of communicating with processing system 1102 or possibly other systems.

Software 1105 (including address mapping process 1106) may be implemented in program instructions and among other functions may, when executed by processing system 1102, direct processing system 1102 to operate as described with respect to the various operational scenarios, sequences, and processes illustrated herein. For example, software 1105 may include program instructions for implementing an address space mapping process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded environment, in a single processor or multi-processor environment, in a single host or multi-host environment, or in accordance with any other suitable execution paradigm, variation, or combination thereof. Software 1105 may include additional processes, programs, or components, such as operating system software, virtualization software, or other application software. Software 1105 may also comprise firmware or some other form of machine-readable processing instructions executable by processing system 1102.

In general, software 1105 may, when loaded into processing system 1102 and executed, transform a suitable apparatus, system, or device (of which computing system 1101 is representative) overall from a general-purpose computing system into a special-purpose computing system customized to provide memory access as described herein. Indeed, encoding software 1105 on storage system 1103 may transform the physical structure of storage system 1103. The specific transformation of the physical structure may depend on various factors in different implementations of this description. Examples of such factors may include, but are not limited to, the technology used to implement the storage media of storage system 1103 and whether the computer-storage media are characterized as primary or secondary storage, as well as other factors.

For example, if the computer readable storage media are implemented as semiconductor-based memory, software 1105 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1107 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1101 and other computing systems (not shown), may occur over a communication network or networks and in accordance with various communication protocols, combinations of protocols, or variations thereof.

Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

Example embodiments of the present disclosure are summarized here. Other embodiments can also be understood from the entirety of the specification and the claims filed herein.

Example 1. A method, including: receiving, from a primary device, a logical address; determining an address header based on the logical address; determining an offset value based on the address header; applying the offset value to a first portion of the logical address to create an offset address portion; generating a physical address that includes the address header and the offset address portion; and accessing a physical resource using the physical address.

Example 2. The method of example 1, where the physical resource includes: a ROM, a random access memory, a flash memory, a tightly-coupled memory, a peripheral, or a hardware accelerator.

Example 3. The method of one of examples 1 or 2, where the logical address indicates a physical resource type, where determining the address header includes determining the address header based on the physical resource type.

Example 4. The method of one of examples 1 to 3, where the physical resource type includes an internal memory, an external memory, or an external device.

Example 5. The method of one of examples 1 to 4, where the logical address further indicates a security type, where determining the address header includes determining the address header based on the security type.

Example 6. The method of one of examples 1 to 5, where the primary device includes one or more processing units or central processing units (CPUs), or one or more direct memory access (DMA) controllers.

Example 7. The method of one of examples 1 to 6, further including: identifying, based on the address header, an offset module used to determine the offset value, where the offset module corresponds to the physical resource; and providing the address header to the identified offset module.

Example 8. The method of one of examples 1 to 7, where determining the address header, identifying the offset module, determining the offset value, and applying the offset value to the first portion of the logical address occurs within one clock cycle.

Example 9. The method of one of examples 1 to 8, where determining the address header and identifying the offset module occurs within a first edge of the one clock cycle, and where determining the offset value and applying the offset value to the first portion of the logical address occurs within a second edge of the one clock cycle.

Example 10. The method of one of examples 1 to 9, where determining the address header is further based on a most-significant bit of the logical address.

Example 11. The method of one of examples 1 to 10, where accessing physical resource using the physical address occurs without intervention by a firewall at the corresponding physical resource.

Example 12. The method of one of examples 1 to 11, where applying the offset value to the logical address includes identifying the offset value in a look-up table and adding or subtracting the offset value to the first portion of the logical address.

Example 13. The method of one of examples 1 to 12, further including updating the look-up table with a new offset value.

Example 14. The method of one of examples 1 to 13, where the offset value is a first offset value, and where the physical address is a first physical address, the method further including: updating the first offset value to a second offset value that is different from the first offset value; after updating the first offset value to the second offset value, receiving, from the primary device, the logical address; determining the second offset value based on the address header; applying the second offset value to the first portion of the logical address to create a second offset address portion; generating a second physical address associated with the physical resource that includes the address header and the second offset address portion, where the second physical address is different from the first physical address; and accessing the physical resource using the second physical address.

Example 15. The method of one of examples 1 to 14, where the address header is a first address header, where the logical address is a first logical address, where the physical resource is a first physical resource, and where the physical address is a first physical address, the method further including: after receiving the first logical address from the primary device, receiving, from the primary device, a second logical address that is equal to the first logical address; determining a second address header based on the second logical address, where the second address header is different from the first address header; generating a second physical address that includes the second address header, where the second physical address is different from the first physical address; and accessing a second physical resource using the second physical address, where the second physical resource is different from the first physical resource.

Example 16. The method of one of examples 1 to 15, where the physical address is a first physical address, where receiving the logical address includes receiving a first request from a first thread, and where the first request includes the logical address, the method further including: receiving, from a second primary device and after receiving the first request, a second request from a second thread, the second request including the logical address; generating a second physical address based on the logical address and based on the second request being received from the second thread, where the second physical address is different from the first physical address; and accessing the second physical address.

Example 17. The method of one of examples 1 to 16, where the primary device and the second primary device are the same device.

Example 18. The method of one of examples 1 to 17, where the first thread is a boot thread, and where the second thread is a non-boot thread.

Example 19. The method of one of examples 1 to 18, where the logical address includes a security type, where determining the address header is based on the security type.

Example 20. An electronic circuit, including: a conversion circuit; and an offset circuit; where the conversion circuit is configured to: receive, from a primary device, a logical address associated with a physical resource; determine an address header based on the logical address; and provide the address header to the offset circuit; and where the offset circuit is configured to: determine an offset value based on the address header; apply the offset value to a first portion of the logical address to create an offset address portion; generate a physical address that includes the address header and the offset address portion; and output the physical address.

Example 21. The electronic circuit of example 20, further including the primary device, where the primary device includes one or more central processing units (CPUs), or one or more direct memory access (DMA) controllers.

Example 22. The electronic circuit of one of examples 20 or 21, where the primary device, the conversion circuit, and the offset circuit are integrated in the same integrated circuit.

Example 23. The electronic circuit of one of examples 20 to 22, further including the physical resource, where the physical resource includes a random access memory, a ROM, a flash memory, a tightly-coupled memory, a peripheral, or a hardware accelerator.

Example 24. The electronic circuit of one of examples 20 to 23, further including a plurality of physical resources and a plurality of offset circuits, where each physical resource of the plurality of physical resources is coupled to a respective offset circuit of the plurality of offset circuits.

Example 25. The electronic circuit of one of examples 20 to 24, where determining the address header is based on a most-significant bit of the logical address.

Example 26. The electronic circuit of one of examples 20 to 25, where applying the offset to the logical address includes identifying the offset value in a look-up table and adding or subtracting the offset value to the first portion of the logical address.

Example 27. An electronic circuit, including: a conversion circuit; and a plurality of offset circuits, each offset circuit of the plurality of offset circuits coupled to the conversion circuit; where the conversion circuit includes: an interface device configured to receive a logical address from a primary device; and a first selector device configured to select a first offset circuit from the plurality of offset circuits based on the logical address and provide a first portion of the logical address to the first offset circuit; where each offset circuit of the plurality of offset circuits includes: a storage device configured to store an offset value associated with a physical resource; and an adder device configured to add the offset value with the first portion of the logical address to generate an offset address portion; and where the electronic circuit is configured to provide a physical address that includes the offset address portion.

Example 28. The electronic circuit of example 27, where the offset address portion includes a plurality of bits between a most significant bit of the physical address and a least significant bit of the physical address, not inclusive.

Example 29. The electronic circuit of one of examples 27 or 28, where the physical resource includes a random access memory, a ROM, a flash memory, a tightly-coupled memory, a peripheral, or a hardware accelerator.

Example 30. The electronic circuit of one of examples 27 to 29, where the first selector device includes a first splitter device configured to identify a security type of the logical address and a second splitter device configured to identify a physical resource type of the logical address, where the first splitter device and the second splitter device each include one or more comparators configured to select the first offset circuit based on the security type and the physical resource type.

Example 31. The electronic circuit of one of examples 27 to 30, where the physical resource type includes an internal memory, an external memory, or an external device.

Example 32. The electronic circuit of one of examples 27 to 31, where the security type includes a secure type or a non-secure type.

Example 33. The electronic circuit of one of examples 27 to 32, where the primary device includes one or more processing units or one or more direct memory access (DMA) controllers.

Example 34. The electronic circuit of one of examples 27 to 33, where the storage devices of the plurality of offset circuits include flip-flops.

Example 35. The electronic circuit of one of examples 27 to 34, where each offset circuit of the plurality of offset circuits further includes a first multiplexer and a second multiplexer, where the first multiplexer is configured to select the offset value from the storage device and provide the offset value to the second multiplexer, and where the second multiplexer is configured to receive the offset value from the storage device and an initial offset value from an initial offset storage device and provide either the offset value or the initial offset value to the adder device.

Example 36. The electronic circuit of one of examples 27 to 35, where, in response to the second multiplexer providing the initial offset value to the adder device, the adder device is configured to add or subtract the initial offset value with the first portion of the logical address to generate a further offset address portion.

While some examples provided herein are described in the context of address space mapping systems, circuits, sub-circuits, hardware, software, electrical components and environments thereof, the systems and methods described herein are not limited to such embodiments and may apply to a variety of other processes, systems, applications, devices, and the like. Aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

While this disclosure has been described with reference to illustrative embodiments, this description is not limiting. Various modifications and combinations of the illustrative embodiments, as well as other embodiments, will be apparent to persons skilled in the art upon reference to the description.

What is claimed is:

1. A method, comprising:
   receiving, from a primary device, a logical address;
   determining an address header based on the logical address;
   determining an offset value based on the address header;
   applying the offset value to a first portion of the logical address to create an offset address portion;
   generating a physical address that includes the address header and the offset address portion;
   accessing a physical resource using the physical address; and
   identifying, based on the address header, an offset module used to determine the offset value, wherein the offset module corresponds to the physical resource; and providing the address header to the identified offset module, wherein determining the address header, identifying the offset module, determining the offset value, and applying the offset value to the first portion of the logical address occurs within one clock cycle.

2. The method of claim 1, wherein the physical resource comprises: a read-only memory (ROM), a random access memory (RAM), a flash memory, a tightly-coupled memory, a peripheral, or a hardware accelerator.

3. The method of claim 1, wherein the logical address indicates a physical resource type, wherein determining the address header comprises determining the address header based on the physical resource type.

4. The method of claim 3, wherein the physical resource type comprises an internal memory, an external memory, or an external device.

5. The method of claim 3, wherein the logical address further indicates a security type, wherein determining the address header comprises determining the address header based on the security type.

6. The method of claim 1, wherein the primary device comprises a central processing unit (CPU, a graphical processing unit (GPU), a digital processing unit (DPU), a digital signal processor (DSP) or a direct memory access (DMA) controller.

7. The method of claim 1, wherein determining the address header and identifying the offset module occurs within a first edge of the one clock cycle, and wherein determining the offset value and applying the offset value to the first portion of the logical address occurs within a second edge of the one clock cycle.

8. The method of claim 1, wherein determining the address header is further based on a most-significant bit of the logical address.

9. The method of claim 1, wherein accessing the physical resource using the physical address occurs without intervention by a firewall at the corresponding physical resource.

10. The method of claim 1, wherein applying the offset value to the logical address comprises identifying the offset value in a look-up table and adding or subtracting the offset value to the first portion of the logical address.

11. The method of claim 10, further comprising updating the look-up table with a new offset value.

12. The method of claim 1, wherein the offset value is a first offset value, and wherein the physical address is a first physical address, the method further comprising:
updating the first offset value to a second offset value that is different from the first offset value;
after updating the first offset value to the second offset value, receiving, from the primary device, the logical address;
determining the second offset value based on the address header;
applying the second offset value to the first portion of the logical address to create a second offset address portion;
generating a second physical address associated with the physical resource that includes the address header and the second offset address portion, wherein the second physical address is different from the first physical address; and
accessing the physical resource using the second physical address.

13. The method of claim 1, wherein the address header is a first address header, wherein the logical address is a first logical address, wherein the physical resource is a first physical resource, and wherein the physical address is a first physical address, the method further comprising:
after receiving the first logical address from the primary device, receiving, from the primary device, a second logical address that is equal to the first logical address;
determining a second address header based on the second logical address, wherein the second address header is different from the first address header;
generating a second physical address that includes the second address header, wherein the second physical address is different from the first physical address; and
accessing a second physical resource using the second physical address, wherein the second physical resource is different from the first physical resource.

14. The method of claim 1, wherein the logical address comprises a security type, wherein determining the address header is based on the security type.

15. A method, comprising:
receiving, from a primary device, a logical address;
determining an address header based on the logical address;
determining an offset value based on the address header;
applying the offset value to a first portion of the logical address to create an offset address portion;
generating a physical address that includes the address header and the offset address portion; and
accessing a physical resource using the physical address, wherein the physical address is a first physical address, wherein receiving the logical address comprises receiving a first request from a first thread, and wherein the first request comprises the logical address, the method further comprising:
receiving, from a second primary device and after receiving the first request, a second request from a second thread, the second request comprising the logical address;
generating a second physical address based on the logical address and based on the second request being received from the second thread, wherein the second physical address is different from the first physical address; and
accessing the second physical address.

16. The method of claim 15, further comprising:
identifying, based on the address header, an offset module used to determine the offset value, wherein the offset module corresponds to the physical resource; and
providing the address header to the identified offset module.

17. The method of claim 16, wherein determining the address header, identifying the offset module, determining the offset value, and applying the offset value to the first portion of the logical address occurs within one clock cycle.

18. The method of claim 15, wherein the primary device and the second primary device are the same device.

19. The method of claim 15, wherein the first thread is a boot thread, and wherein the second thread is a non-boot thread.

20. An electronic circuit, comprising:
a conversion circuit; and
an offset circuit;
wherein the conversion circuit is configured to:
receive, from a primary device, a logical address associated with a physical resource;
determine an address header based on the logical address; and provide the address header to the offset circuit; and
wherein the offset circuit is configured to:
determine an offset value based on the address header;

apply the offset value to a first portion of the logical address to create an offset address portion;
generate a physical address that includes the address header and the offset address portion; and
output the physical address.

21. The electronic circuit of claim 20, further comprising the primary device, wherein the primary device comprises a central processing unit (CPU) or a direct memory access (DMA) controller.

22. The electronic circuit of claim 21, wherein the primary device, the conversion circuit, and the offset circuit are integrated in the same integrated circuit.

23. The electronic circuit of claim 20, further comprising the physical resource, wherein the physical resource comprises a random access memory, a read-only memory, a flash memory, a tightly-coupled memory, a peripheral, or a hardware accelerator.

24. The electronic circuit of claim 20, further comprising a plurality of physical resources and a plurality of offset circuits, wherein each physical resource of the plurality of physical resources is coupled to a respective offset circuit of the plurality of offset circuits.

25. The electronic circuit of claim 20, wherein determining the address header is based on a most-significant bit of the logical address.

26. The electronic circuit of claim 20, wherein applying the offset to the logical address comprises identifying the offset value in a look-up table and adding or subtracting the offset value to the first portion of the logical address.

27. An electronic circuit, comprising:
a conversion circuit; and
a plurality of offset circuits, each offset circuit of the plurality of offset circuits coupled to the conversion circuit;
wherein the conversion circuit comprises:
an interface device configured to receive a logical address from a primary device; and
a first selector device configured to select a first offset circuit from the plurality of offset circuits based on the logical address and provide a first portion of the logical address to the first offset circuit;
wherein each offset circuit of the plurality of offset circuits comprises:
a storage device configured to store an offset value associated with a physical resource; and
an adder device configured to add the offset value with the first portion of the logical address to generate an offset address portion; and wherein the electronic circuit is configured to provide a physical address that includes the offset address portion.

28. The electronic circuit of claim 27, wherein the offset address portion includes a plurality of bits between a most significant bit of the physical address and a least significant bit of the physical address, not inclusive.

29. The electronic circuit of claim 27, wherein the physical resource comprises a random access memory, a read-only memory, a flash memory, a tightly-coupled memory, a peripheral, or a hardware accelerator.

30. The electronic circuit of claim 27, wherein the first selector device comprises a first splitter device configured to identify a security type of the logical address and a second splitter device configured to identify a physical resource type of the logical address, wherein the first splitter device and the second splitter device each comprise one or more comparators configured to select the first offset circuit based on the security type and the physical resource type.

31. The electronic circuit of claim 30, wherein the physical resource type comprises an internal memory, an external memory, or an external device.

32. The electronic circuit of claim 30, wherein the security type comprises a secure type or a non-secure type.

33. The electronic circuit of claim 27, wherein the primary device comprises one or more processing units or one or more direct memory access (DMA) controllers.

34. The electronic circuit of claim 27, wherein the storage device of the plurality of offset circuits comprise flip-flops.

35. The electronic circuit of claim 27, wherein each offset circuit of the plurality of offset circuits further comprises a first multiplexer and a second multiplexer, wherein the first multiplexer is configured to select the offset value from the storage device and provide the offset value to the second multiplexer, and wherein the second multiplexer is configured to receive the offset value from the storage device and an initial offset value from an initial offset storage device and provide either the offset value or the initial offset value to the adder device.

36. The electronic circuit of claim 35, wherein, in response to the second multiplexer providing the initial offset value to the adder device, the adder device is configured to add or subtract the initial offset value with the first portion of the logical address to generate a further offset address portion.

* * * * *